(12) United States Patent
Chhabra et al.

(10) Patent No.: US 7,623,060 B1
(45) Date of Patent: Nov. 24, 2009

(54) SYSTEMS AND METHODS FOR DETECTING RADAR

(75) Inventors: Kapil Chhabra, Sunnyvale, CA (US); Bhaskar V. Nallapureddy, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 165 days.

(21) Appl. No.: 11/821,719

(22) Filed: Jun. 25, 2007

Related U.S. Application Data

(60) Provisional application No. 60/817,325, filed on Jun. 29, 2006.

(51) Int. Cl.
G01S 7/40 (2006.01)
(52) U.S. Cl. .......................................... 342/20; 342/52
(58) Field of Classification Search ..................... 342/20
See application file for complete search history.

(56) References Cited

U.S. PATENT DOCUMENTS

| | | | | |
|---|---|---|---|---|
| 4,005,416 | A * | 1/1977 | Tucker et al. ................. | 342/90 |
| 4,070,673 | A * | 1/1978 | Schmidt et al. ............... | 342/90 |
| 4,089,002 | A * | 5/1978 | Kerr et al. .................... | 342/93 |
| 4,425,617 | A * | 1/1984 | Sherwood .................... | 710/65 |
| 4,523,325 | A * | 6/1985 | Justus .......................... | 377/44 |
| 4,876,545 | A * | 10/1989 | Carlson et al. ................ | 342/14 |
| 4,896,158 | A * | 1/1990 | Cole, Jr. ....................... | 342/40 |
| 4,928,105 | A * | 5/1990 | Langner ...................... | 342/192 |
| 5,063,385 | A * | 11/1991 | Caschera ..................... | 342/13 |
| 5,563,806 | A * | 10/1996 | Barry et al. .................. | 702/190 |
| 5,583,505 | A * | 12/1996 | Andersen et al. ............. | 342/13 |
| 5,831,570 | A * | 11/1998 | Ammar et al. ............ | 342/26 B |
| 6,043,771 | A * | 3/2000 | Clark et al. ................... | 342/13 |
| 6,311,108 | B1 * | 10/2001 | Ammar et al. ................ | 701/16 |
| 6,369,749 | B1 * | 4/2002 | Frey, Jr. ....................... | 342/93 |
| 6,430,480 | B1 * | 8/2002 | Ammar et al. ................ | 701/16 |
| 6,591,171 | B1 * | 7/2003 | Ammar et al. ................ | 701/16 |
| 6,985,102 | B1 * | 1/2006 | Horn et al. .................... | 342/13 |
| 7,024,188 | B2 * | 4/2006 | Khun-Jush et al. .......... | 455/423 |
| 7,242,346 | B1 * | 7/2007 | Slutzky et al. .............. | 342/169 |

(Continued)

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner*—Thomas H Tarcza
*Assistant Examiner*—Matthew M Barker

(57) ABSTRACT

A system includes a first-in first-out (FIFO) module, a polling module, a data extraction module, and a control module. The FIFO module receives records having dynamic frequency selection (DFS) information generated based on pulses received and generates a control signal for every N of the records received, where N is an integer greater than or equal to 1. The polling module selectively polls the FIFO module and reads M of the records received by the FIFO module, where M is an integer greater than or equal to 1 and less than N. The data extraction module extracts the DFS information from the N records when the control signal is received and selectively extracts the DFS information from the M records. The control module determines whether the pulses are a type of radar based on the DFS information extracted from at least N of the (N+M) of the records.

45 Claims, 18 Drawing Sheets

U.S. PATENT DOCUMENTS

| | | | |
|---|---|---|---|
| 2004/0028123 A1* | 2/2004 | Sugar et al. | 375/224 |
| 2004/0033789 A1* | 2/2004 | Tsien | 455/130 |
| 2004/0132411 A1* | 7/2004 | Li | 455/67.13 |
| 2004/0156336 A1* | 8/2004 | McFarland et al. | 370/329 |
| 2004/0157580 A1* | 8/2004 | Stadelmeier et al. | 455/338 |
| 2005/0002473 A1* | 1/2005 | Kloper et al. | 375/316 |
| 2005/0035903 A1* | 2/2005 | Bergkvist | 342/160 |
| 2005/0059363 A1* | 3/2005 | Hansen | 455/127.4 |
| 2005/0059364 A1* | 3/2005 | Hansen et al. | 455/127.4 |
| 2006/0199587 A1* | 9/2006 | Hansen | 455/442 |
| 2007/0077892 A1* | 4/2007 | Muquet | 455/67.11 |
| 2007/0281638 A1* | 12/2007 | Hansen | 455/127.4 |

OTHER PUBLICATIONS

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

IEEE Std 802.11h™-2003 (Amendment to IEEE Std 802.11™, 1999 Edition (Reaff 2003), as amended by IEEE Stds 802.11a™-1999, 802.11b™-1999, 802.11b™-1999/Cor 1-2001, 802.11d™-2001, and 802.11g™-2003); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; LAN/MAN Standards Committee of the IEEE Computer Society; Oct. 14, 2003; 74 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems —Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

Doc.: IEEE 802.11-04/0889r6; IEEE P802.11 Wireless LANs; TGn Sync Proposal Technical Specification; Agere Systems Inc., Syed Aon Mujtaba, 555 Union Blvd., Allentown, PA 18109, U.S.A.; May 18, 2005; 106 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

International Standard; ISO/IEC 8802-11; ANSI/IEEE Std 802.11 First edition 1999-00-00; Information technology- Telecommunications and information exchange between systems- Local and metropolitan area networks—Specific requirements—Part 11: Wireless LAN Medium Access Control (MAC) and Physical Layer (PHY) specifications; 531 pages.

U.S. Appl. No. 11/493,473, filed Jul. 26, 2006; Applicant: Nallapureddy, Bhaskar et al.; Title Detection and Estimation of Radio Frequency Variations; Marvell Reference No. MP0872; 59 pages.

* cited by examiner

|  | Pulse Width (μs) | Pulse repetition interval (μs) | Pulses per burst | Pulse Modulation | Hopping Rate |
|---|---|---|---|---|---|
| Bin 1 | 1 | 1428 | 18 | None | n/a |
| Bin 2 | 1-5 | 150-230 | 23-29 | None | n/a |
| Bin 3 | 5-10 | 250-500 | 16-18 | None | n/a |
| Bin 4 | 10-20 | 250-500 | 12-16 | None | n/a |
| Bin 5 | 50-100 | 1000-5000 | 1-3 | 5-20 MHz linear chirp | |
| Frequency Hopping | 1 | 333 | 9 pulses per hop; 100 hops per burst | | 333 Hz |

The bin 5 waveform is to be made of between 8 and 20 bursts over a 12 second period. Each burst contains one, two or three pulses. Each pulse within a burst has the same modulation and width but the repetition interval (for the three-pulse burst) can be different between the first and second, and second and third pulses). The parameters for the pulses in different bursts are not identical.

*FIG. 3B*

|  | Pulse Width (μs) | Pulse repetition interval (μs) | Pulses per burst | Pulse | Detection Success Rate |
|---|---|---|---|---|---|
| Type 1 | 1 | 750 | 15 | None | > 60% |
| Type 2 | 1, 2 or 5 | 200, 300, 500, 800 or 1000 | 10 | None | > 60% |
| Type 3 | 10 or 15 | 200, 300, 500, 800 or 1000 | 15 | None | > 60% |
| Type 4 | 1, 2, 5, 10 or 15 | 1200, 1500 or 1600 | 15 | None | > 60% |
| Type 5 | 1, 2, 5, 10 or 15 | 2300, 3000, 3500 or 4000 | 25 | None | > 60% |
| Type 6 | 20, 30 | 2000, 3000 or 4000 | 20 | 5 MHz (±2.5MHz) chirp | > 60% |

*FIG. 3C*

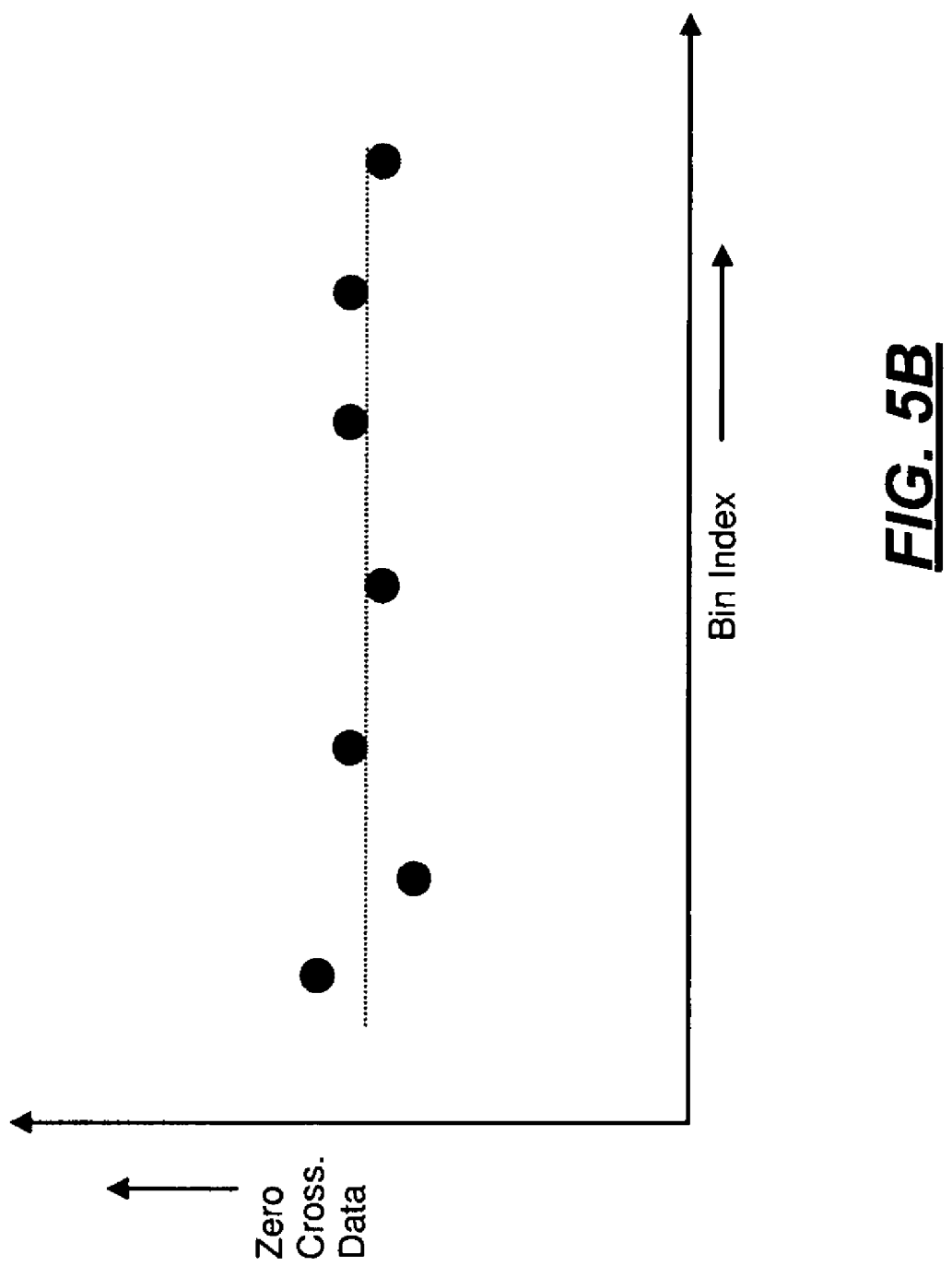

SYSTEMS AND METHODS FOR DETECTING RADAR

CROSS-REFERENCE TO RELATED APPLICATIONS

This application claims the benefit of U.S. Provisional Application No. 60/817,325 filed on Jun. 29, 2006. The disclosure of the above application is incorporated herein by reference in its entirety.

FIELD

The present disclosure relates to wireless networks, and more particularly to systems and methods for detecting radar signals in wireless network devices.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The I.E.E.E. has defined various standards for configuring wireless networks and devices. For example, 802.11, 802.11 (a), 802.11(b), 802.11(g), 802.11(h), 802.11(n), 802.16, and 802.20. According to these standards, wireless network devices may be operated in either an infrastructure mode or an ad-hoc mode. In the infrastructure mode, the wireless network devices or client stations communicate with each other through an access point. In the ad-hoc mode, the wireless network devices communicate directly with each other and do not employ an access point.

Referring now to FIG. 1, a first wireless network 10 is illustrated in an infrastructure mode. The first wireless network 10 includes one or more client stations 12 and one or more access points (AP) 14. The client station 12 and the AP 14 transmit and receive wireless signals 16. The AP 14 is a node in a network 18. The network 18 may be a local area network (LAN), a wide area network (WAN), or another network configuration. The network 18 may include other nodes such as a server 20 and may be connected to a distributed communications system 22 such as the Internet.

Referring now to FIG. 2, a second wireless network 24 operates in an ad-hoc mode. The second wireless network 24 includes multiple client stations 26-1, 26-2, and 26-3 that transmit and receive wireless signals 28. The client stations 26-1, 26-2, and 26-3 collectively form a LAN and communicate directly with each other. The client stations 26-1, 26-2, and 26-3 are not necessarily connected to another network.

To minimize radio frequency (RF) interference, some wireless networks may operate in a 5 GHz band. However, regulatory requirements governing the use of the 5 GHz band vary from country to country. For example, some countries utilize the 5 GHz band for military radar communications. Therefore, wireless networks operating in the 5 GHz band generally employ dynamic frequency selection (DFS) to avoid interference with radar communications. Specifically, wireless network devices generally employ DFS to switch to a different channel of the 5 GHz band to avoid interfering with radar communications.

In infrastructure mode, the AP 14 transmits beacons to inform the client stations 12 that the AP uses DFS. When the client stations 12 detect radar on a channel, the client stations 12 notify the AP 14. Based on this information, the AP 14 uses DFS to select the best channel for network communications that will not interfere with radar.

In ad-hoc mode, one client station may be designated as a DFS owner. The DFS owner is responsible for collecting information from other client stations. If any client station in the ad-hoc network detects radar, the DFS owner uses DFS to select the best channel for network communications that does not interfere with radar. For example, if station 26-1 is the DFS owner, it is responsible for collecting information from stations 26-2 and 26-3. If any of the stations 26-1, 26-2, and 26-3 detects radar, station 26-1 uses DFS to select the best channel and notify stations 26-2 and 26-3 to switch to that channel.

Referring now to FIGS. 3A-3C, radar signals generally comprise bursts of pulses that have predetermined pulse widths and pulse repetition rates. FIG. 3A shows a burst of radar. Radar signals can be tone or chirp type. Frequency of tone type radar pulses is generally fixed, whereas frequency of chirp type radar pulses may vary linearly. Based on characteristics such as pulse width (PW), pulse repetition rate (PRI), etc., radar signals may be classified into different types. For example, a table in FIG. 3B shows types of radar signals and respective standards specified by the federal communications commission (FCC). Similarly, a table in FIG. 3C shows types of radar signals and respective standards specified by the European telecommunications standards institute (ETSI).

SUMMARY

A system comprises a first-in first-out (FIFO) module, a polling module, a data extraction module, and a control module. The FIFO module receives records having dynamic frequency selection (DFS) information generated based on pulses received and generates a control signal for every N of the records received, where N is an integer greater than or equal to 1. The polling module selectively polls the FIFO module and reads M of the records received by the FIFO module, where M is an integer greater than or equal to 1 and less than N. The data extraction module extracts the DFS information from the N of the records when the control signal is received and selectively extracts the DFS information from the M of the records. The control module determines whether the pulses are a type of radar based on the DFS information extracted from at least N of the (N+M) of the records.

In another feature, the DFS information comprises pulse widths and pulse repetition rates of the pulses, signal strength of radio frequency (RF) signals in the pulses, and whether the pulses are one of a tone type and a chirp type radar pulses.

In another feature, the polling module polls the FIFO module when the DFS information extracted from a predetermined number of records out of the N of the records indicates that the pulses are not radar pulses.

In another feature, the system further comprises a buffer module that stores the DFS information extracted by the data extraction module.

In another feature, The pulses are received from at least one burst of radar.

In another feature, the control module determines that the pulses are a type of tone radar when the DFS information extracted from each of the at least N of the (N+M) of the records includes information that a corresponding one of the pulses is a tone radar pulse, an average of pulse widths in the DFS information extracted from each of the at least N of the (N+M) of the records approximately matches a pulse width of a predetermined type of tone radar, a difference between a maximum and a minimum of the pulse widths is less than a predetermined threshold, and pulse repetition intervals in the DFS information extracted from a predetermined number of the at least N of the (N+M) of the records approximately match a pulse repetition interval of the predetermined type of tone radar.

In another feature, the control module determines that the pulses are a type of chirp radar when the DFS information extracted from each of the at least N of the (N+M) of the records includes information that a corresponding one of the pulses is a chirp radar pulse, pulse widths in the DFS information extracted from the at least N of the (N+M) of the records approximately match pulse widths of a predetermined type of chirp radar, and pulse repetition intervals in the DFS information extracted from a predetermined number of the at least N of the (N+M) of the records approximately match pulse repetition intervals of the predetermined type of chirp radar.

In another feature, the control module determines whether the pulses are a type of one of a tone radar and a chirp radar based on pulse widths in the DFS information extracted from at least N of the records when the pulses are received from at least one burst of radar and when the pulses are separated by at least one data packet.

In another feature, the control module determines that the pulses are a type of tone radar when the pulse widths match a pulse width of a predetermined type of tone radar and wherein the control module determines that the pulses are a type of chirp radar when the pulse widths match pulse widths of a predetermined type of chirp radar.

In another feature, the pulses comprise radio frequency (RF) signals and the DFS information includes a number of zero-crossings of the RF signals per bin for a plurality of bins, where the bin is a time period greater than or equal to a smallest of pulse widths of predetermined types of radar pulses.

In another feature, the control module determines that the pulses are tone type radar pulses when a difference between maximum and minimum values of the number of zero-crossings is less than a predetermined threshold.

In another feature, the control module determines that the pulses are chirp type radar pulses when differences between the number of zero-crossings in adjacent bins are greater than a first predetermined threshold and a rate of change of the number of zero-crossings in successive bins is less than a second predetermined threshold.

In another feature, a medium access controller (MAC) comprises the system and further comprises a physical layer module (PHY) that communicates the records to the MAC.

In another feature, a wireless network device comprises the MAC and further comprises at least one antenna that receives the pulses and that communicates the pulses to the PHY.

In another feature, a radar detection device comprises the system.

In still other features, a method comprises receiving records having dynamic frequency selection (DFS) information generated based on pulses received in a first-in first-out (FIFO) module and generating a control signal for every N of the records received, where N is an integer greater than or equal to 1. The method further comprises selectively polling the FIFO module and reading M of the records received by the FIFO module, where M is an integer greater than or equal to 1 and less than N. The method further comprises extracting the DFS information from the N of the records when the control signal is received, selectively extracting the DFS information from the M of the records, and determining whether the pulses are a type of radar based on the DFS information extracted from at least N of the (N+M) of the records.

In another feature, the method further comprises receiving the records having the DFS information that includes pulse widths and pulse repetition rates of the pulses, signal strength of radio frequency (RF) signals in the pulses, and whether the pulses are one of a tone type and a chirp type radar pulses.

In another feature, the method further comprises polling the FIFO module when the DFS information extracted from a predetermined number of records out of the N of the records indicates that the pulses are not radar pulses.

In another feature, the method further comprises storing the DFS information extracted by the data extraction module.

In another feature, the method further comprises receiving the pulses from at least one burst of radar.

In another feature, the method further comprises determining that the pulses are a type of tone radar when the DFS information extracted from each of the at least N of the (N+M) of the records includes information that a corresponding one of the pulses is a tone radar pulse, an average of pulse widths in the DFS information extracted from each of the at least N of the (N+M) of the records approximately matches a pulse width of a predetermined type of tone radar, a difference between a maximum and a minimum of the pulse widths is less than a predetermined threshold, and pulse repetition intervals in the DFS information extracted from a predetermined number of the at least N of the (N+M) of the records approximately match a pulse repetition interval of the predetermined type of tone radar.

In another feature, the method further comprises determining that the pulses are a type of chirp radar when the DFS information extracted from each of the at least N of the (N+M) of the records includes information that a corresponding one of the pulses is a chirp radar pulse, pulse widths in the DFS information extracted from the at least N of the (N+M) of the records approximately match pulse widths of a predetermined type of chirp radar, and pulse repetition intervals in the DFS information extracted from a predetermined number of the at least N of the (N+M) of the records approximately match pulse repetition intervals of the predetermined type of chirp radar.

In another feature, the method further comprises determining whether the pulses are a type of one of a tone radar and a chirp radar based on pulse widths in the DFS information extracted from at least N of the records when the pulses are received from at least one burst of radar and when the pulses are separated by at least one data packet.

In another feature, the method further comprises determining that the pulses are a type of tone radar when the pulse widths match a pulse width of a predetermined type of tone radar and determining that the pulses are a type of chirp radar when the pulse widths match pulse widths of a predetermined type of chirp radar.

In another feature, the method further comprises receiving the records when the pulses include radio frequency (RF) signals and wherein the DFS information includes a number of zero-crossings of the RF signals per bin for a plurality of bins, where the bin is a time period greater than or equal to a smallest of pulse widths of predetermined types of radar pulses.

In another feature, the method further comprises determining that the pulses are tone type radar pulses when a difference between maximum and minimum values of the number of zero-crossings is less than a predetermined threshold.

In another feature, the method further comprises determining that the pulses are chirp type radar pulses when differences between the number of zero-crossings in adjacent bins are greater than a first predetermined threshold, and a rate of change of the number of zero-crossings in successive bins is less than a second predetermined threshold.

In another feature, the method further comprises communicating between a physical layer module (PHY) and a medium access controller (MAC) and communicating the records to the MAC.

In another feature, the method further comprises receiving the pulses via at least one antenna in a wireless network device and communicating the pulses to the PHY.

In another feature, the method further comprises determining whether the pulses include radar when the pulses are received by a radar detection device.

In still other features, a system comprises first-in first-out (FIFO) means for receiving records having dynamic frequency selection (DFS) information generated based on pulses received and generating a control signal for every N of the records received, where N is an integer greater than or equal to 1. The system further comprises polling means for selectively polling the FIFO means and reading M of the records received by the FIFO means, where M is an integer greater than or equal to 1 and less than N. The system further comprises data extraction means for extracting the DFS information from the N of the records when the control signal is received and selectively extracting the DFS information from the M of the records, and control means for determining whether the pulses are a type of radar based on the DFS information extracted from at least N of the (N+M) of the records.

In another feature, the DFS information comprises pulse widths and pulse repetition rates of the pulses, signal strength of radio frequency (RF) signals in the pulses, and whether the pulses are one of a tone type and a chirp type radar pulses.

In another feature, the polling means polls the FIFO means when the DFS information extracted from a predetermined number of records out of the N of the records indicates that the pulses are not radar pulses.

In another feature, the system further comprises buffer means for storing the DFS information extracted by the data extraction means.

In another feature, the pulses are received from at least one burst of radar.

In another feature, the control means determines that the pulses are a type of tone radar when the DFS information extracted from each of the at least N of the (N+M) of the records includes information that a corresponding one of the pulses is a tone radar pulse, an average of pulse widths in the DFS information extracted from each of the at least N of the (N+M) of the records approximately matches a pulse width of a predetermined type of tone radar, a difference between a maximum and a minimum of the pulse widths is less than a predetermined threshold, and pulse repetition intervals in the DFS information extracted from a predetermined number of the at least N of the (N+M) of the records approximately match a pulse repetition interval of the predetermined type of tone radar.

In another feature, the control means determines that the pulses are a type of chirp radar when the DFS information extracted from each of the at least N of the (N+M) of the records includes information that a corresponding one of the pulses is a chirp radar pulse, pulse widths in the DFS information extracted from the at least N of the (N+M) of the records approximately match pulse widths of a predetermined type of chirp radar, and pulse repetition intervals in the DFS information extracted from a predetermined number of the at least N of the (N+M) of the records approximately match pulse repetition intervals of the predetermined type of chirp radar.

In another feature, the control means determines whether the pulses are a type of one of a tone radar and a chirp radar based on pulse widths in the DFS information extracted from at least N of the records when the pulses are received from at least one burst of radar and when the pulses are separated by at least one data packet.

In another feature, the control means determines that the pulses are a type of tone radar when the pulse widths match a pulse width of a predetermined type of tone radar and wherein the control means determines that the pulses are a type of chirp radar when the pulse widths match pulse widths of a predetermined type of chirp radar.

In another feature, the pulses comprise radio frequency (RF) signals and the DFS information includes a number of zero-crossings of the RF signals per bin for a plurality of bins, where the bin is a time period greater than or equal to a smallest of pulse widths of predetermined types of radar pulses.

In another feature, the control means determines that the pulses are tone type radar pulses when a difference between maximum and minimum values of the number of zero-crossings is less than a predetermined threshold.

In another feature, the control means determines that the pulses are chirp type radar pulses when differences between the number of zero-crossings in adjacent bins are greater than a first predetermined threshold, and a rate of change of the number of zero-crossings in successive bins is less than a second predetermined threshold.

In another feature, a medium access controller (MAC) comprises the system and further comprises physical layer means (PHY) for communicating the records to the MAC.

In another feature, a wireless network device comprises the MAC and further comprises at least one antenna means for receiving the pulses and communicating the pulses to the PHY means.

In another feature, a radar detection device comprises the system.

In still other features, a computer program executed by a processor comprises receiving records having dynamic frequency selection (DFS) information generated based on pulses received in a first-in first-out (FIFO) module and generating a control signal for every N of the records received, where N is an integer greater than or equal to 1. The computer program further comprises selectively polling the FIFO module and reading M of the records received by the FIFO module, where M is an integer greater than or equal to 1 and less than N. The computer program further comprises extracting the DFS information from the N of the records when the control signal is received, selectively extracting the DFS information from the M of the records, and determining whether the pulses are a type of radar based on the DFS information extracted from at least N of the (N+M) of the records.

In another feature, the computer program further comprises receiving the records having the DFS information that includes pulse widths and pulse repetition rates of the pulses, signal strength of radio frequency (RF) signals in the pulses, and whether the pulses are one of a tone type and a chirp type radar pulses.

In another feature, the computer program further comprises polling the FIFO module when the DFS information extracted from a predetermined number of records out of the N of the records indicates that the pulses are not radar pulses.

In another feature, the computer program further comprises storing the DFS information extracted by the data extraction module.

In another feature, the computer program further comprises receiving the pulses from at least one burst of radar.

In another feature, the computer program further comprises determining that the pulses are a type of tone radar when the DFS information extracted from each of the at least N of the (N+M) of the records includes information that a corresponding one of the pulses is a tone radar pulse, an average of pulse widths in the DFS information extracted from each of the at least N of the (N+M) of the records approximately matches a pulse width of a predetermined type of tone radar, a difference between a maximum and a minimum of the pulse widths is less than a predetermined threshold, and pulse repetition intervals in the DFS information extracted from a predetermined number of the at least N of the (N+M) of the records approximately match a pulse repetition interval of the predetermined type of tone radar.

In another feature, the computer program further comprises determining that the pulses are a type of chirp radar when the DFS information extracted from each of the at least N of the (N+M) of the records includes information that a corresponding one of the pulses is a chirp radar pulse, pulse widths in the DFS information extracted from the at least N of the (N+M) of the records approximately match pulse widths of a predetermined type of chirp radar, and pulse repetition intervals in the DFS information extracted from a predetermined number of the at least N of the (N+M) of the records approximately match pulse repetition intervals of the predetermined type of chirp radar.

In another feature, the computer program further comprises determining whether the pulses are a type of one of a tone radar and a chirp radar based on pulse widths in the DFS information extracted from at least N of the records when the pulses are received from at least one burst of radar and when the pulses are separated by at least one data packet.

In another feature, the computer program further comprises determining that the pulses are a type of tone radar when the pulse widths match a pulse width of a predetermined type of tone radar and determining that the pulses are a type of chirp radar when the pulse widths match pulse widths of a predetermined type of chirp radar.

In another feature, the computer program further comprises receiving the records when the pulses include radio frequency (RF) signals and wherein the DFS information includes a number of zero-crossings of the RF signals per bin for a plurality of bins, where the bin is a time period greater than or equal to a smallest of pulse widths of predetermined types of radar pulses.

In another feature, the computer program further comprises determining that the pulses are tone type radar pulses when a difference between maximum and minimum values of the number of zero-crossings is less than a predetermined threshold.

In another feature, the computer program further comprises determining that the pulses are chirp type radar pulses when differences between the number of zero-crossings in adjacent bins are greater than a first predetermined threshold, and a rate of change of the number of zero-crossings in successive bins is less than a second predetermined threshold.

In another feature, the computer program further comprises communicating between a physical layer module (PHY) and a medium access controller (MAC) and communicating the records to the MAC.

In another feature, the computer program further comprises receiving the pulses via at least one antenna in a wireless network device and communicating the pulses to the PHY.

In another feature, the computer program further comprises determining whether the pulses include radar when the pulses are received by a radar detection device.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3B is a table listing parameters of different types of radar signals in the United States;

FIG. 3C is a table listing parameters of different types of radar signals in Europe;

FIG. 5B is a graph of number of zero-crossings per bin as a function of number of bins for a tone type radar;

DETAILED DESCRIPTION

Figure 1:
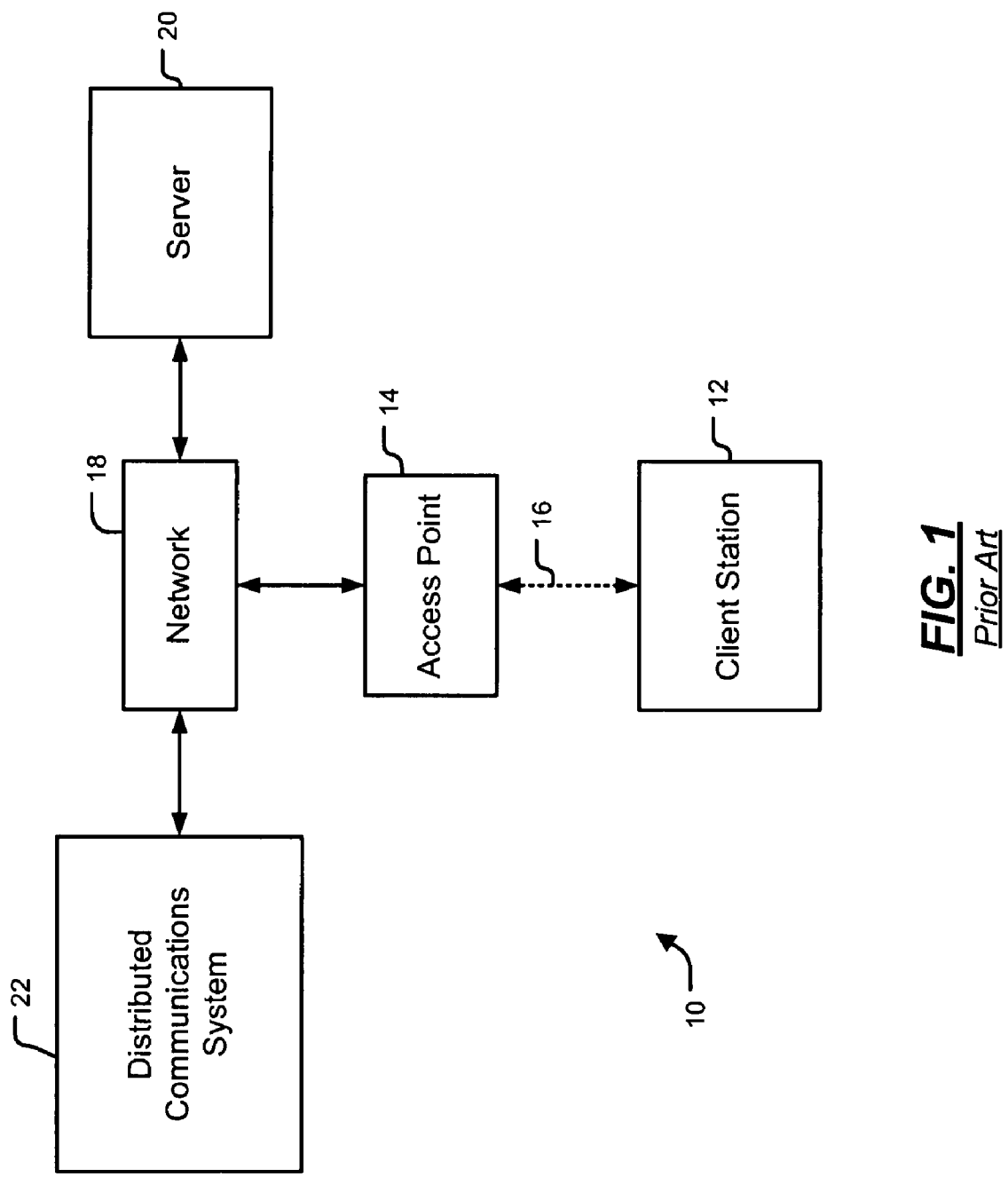
FIG. 1 is functional block diagram of a wireless network operating in an infrastructure mode according to the prior art.
Figure 2:
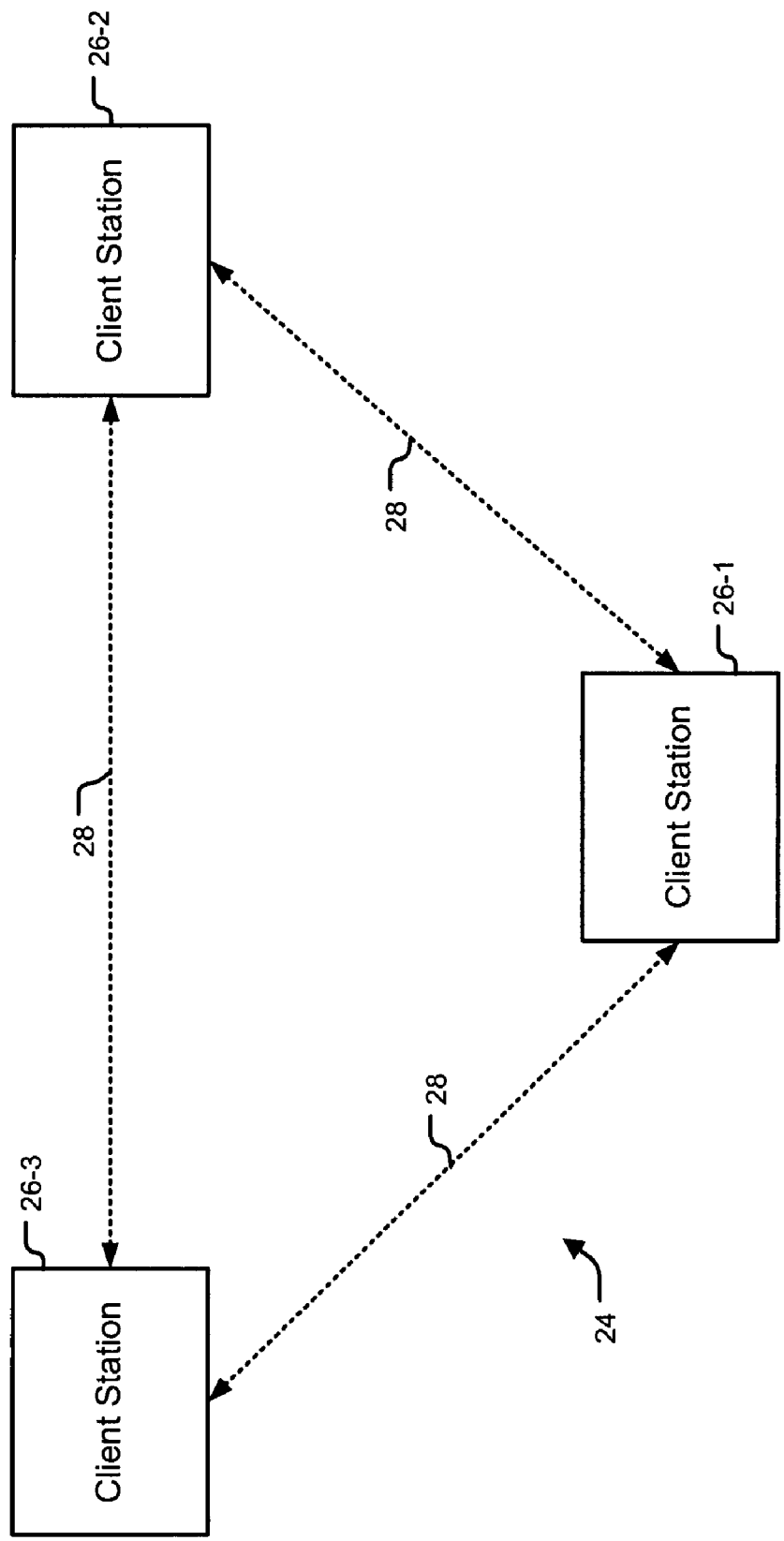
FIG. 2 is a function block diagram of a wireless network operating in an ad-hoc mode according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Systems and methods for detecting radar in wireless networks are disclosed in U.S. patent application Ser. No. 11/493,473 filed on Jul. 26, 2006, which is incorporated herein by reference in its entirety. The systems and methods may be implemented in at least one of a baseband processor (BBP) and a medium access controller (MAC) of a wireless network device. The systems and methods detect radar by analyzing isolated pulses. Consequently, the systems and methods may mis-detect radar when the pulses are generated by noise or interference. Radar may be correctly detected by analyzing a series of pulses in a burst or bursts of radar.

Referring now to FIGS. 4A-4E, a system 100 for detecting radar comprises a MAC FIFO module 102 and a radar detection module 104. The radar detection module 104 comprises a data extraction module 106, a buffer module 108, a control module 110, and a polling module 112. When a wireless network device (not shown) receives pulses that are radar pulses or may be radar pulses, the wireless network device may perform dynamic frequency selection (DFS) and may communicate on a channel other than the current channel.

When the pulses received by the wireless network device are radar pulses or may be radar pulses, a BBP in the wireless network device may generate a 64-byte DFS record for each pulse. The DFS record may include 8 bytes of DFS information, such as radar type (tone or chirp), pulse width (PW), pulse repetition rate (PRI), etc., and 56 bytes of frequency information.

A MAC FIFO module 102 in the wireless network device receives the DFS records from the BBP. The memory size of the MAC FIFO module 102, however, is generally limited. Thus, the number of DFS records that may be queued in the MAC FIFO module 102 may be limited and may be determined by a queue size. The queue size may be programmable and may be set to 10, for example.

When the MAC FIFO module 102 receives a predetermined number of DFS records called a window size (W), which is less than the queue size, the MAC FIFO module 102 generates an interrupt or a control signal. Upon receiving the interrupt, the radar detection module 104 analyzes the DFS records and determines the type of radar received by the BBP. W is programmable and may typically be set to half the queue size. Thus, W may be five if the queue size is 10, and the MAC FIFO module 102 may generate the interrupt after receiving five DFS records. A maximum value of W is less than or equal to a DFS interrupt threshold.

Figure 4A:
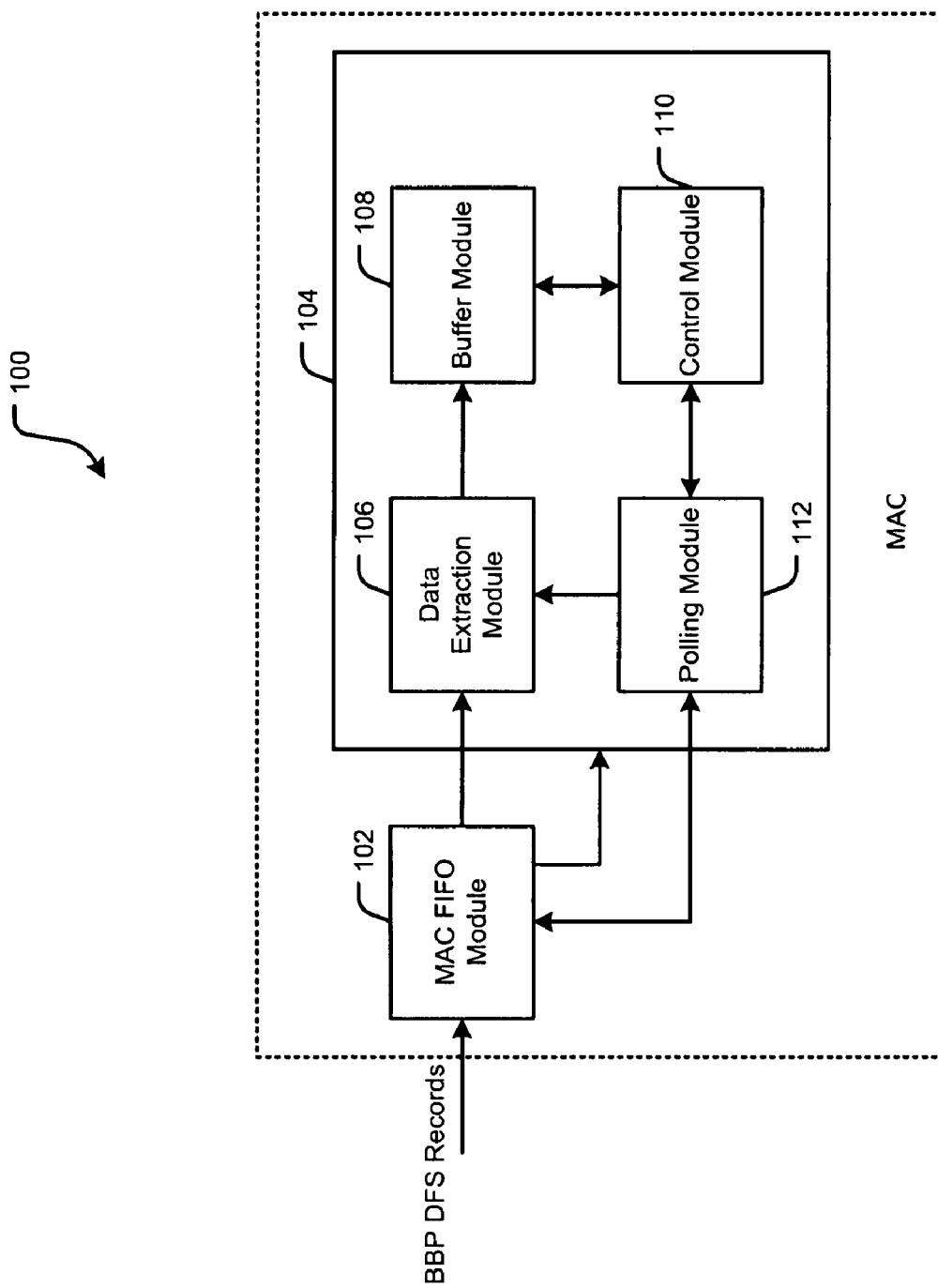
FIG. 4A is a functional block diagram of an exemplary system for detecting radar in a wireless network device according to the present disclosure.
Figure 4B:
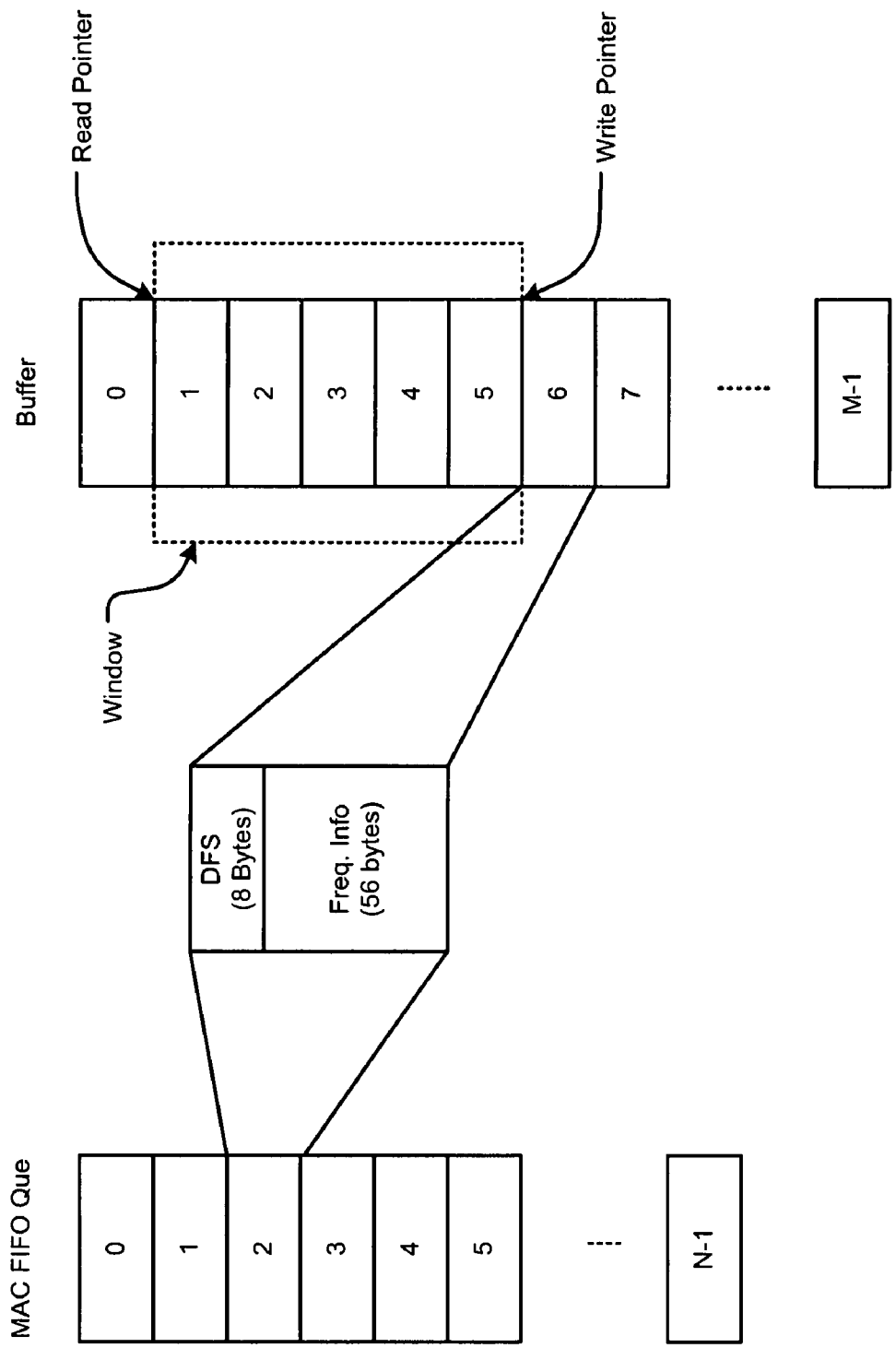
FIG. 4B depicts a sliding-window scheme used by the system of FIG. 4A to detect radar according to the present disclosure.

Upon receiving the control signal, the data extraction module 106 extracts the DFS information from the five DFS records and outputs the DFS information to the buffer module 108. The memory size of the buffer module 108 is generally greater than the memory size of the MAC FIFO module 102. The buffer module 108 stores the DFS information in locations starting at a location determined by a write pointer as shown in FIG. 4B. Additionally, when the BBP is unable to validate frequency information, the buffer module 108 may store the frequency information of the DFS records for subsequent validation.

A read pointer in the buffer module 108 determines a location from where the control module 110 begins reading DFS information as shown in FIG. 4B. The control module 110 reads DFS information stored in (read pointer+W) locations in the buffer module 108 and processes the DFS information to determine the type of radar pulses received by the wireless network device. The control module 110 increments the read pointer after processing the DFS information. Effectively, the window comprising W locations moves or slides to next W locations in the buffer module 108 during each processing cycle. Thus, the window may be called a moving or a sliding window of size W.

The system 100 can correctly detect the type of radar if the buffer module 108 receives at least five records indicating that the pulses are radar pulses. Occasionally, however, due to noise or interference (e.g., spikes generated by microwave devices), some of the DFS records may be corrupted. For example, when W=5, DFS record numbers 2 and 3 may be corrupted. In that case, the DFS information in the corrupted records may indicate that the received pulses are not radar pulses.

The control module 110 analyzes the DFS information in the W records. If the control module 110 determines that a majority of the DFS records indicate that the received pulses are radar pulses, the polling module 112 performs interrupt driven polling. The polling module 112 retrieves additional records from the MAC FIFO module 102 before the MAC FIFO module 102 generates the next interrupt.

Specifically, the control module 110 checks the DFS information in (read pointer+W) locations in the buffer module 108. If the DFS information in a majority of the W locations (e.g., three out of five) indicates that the received pulses are of a known type of radar, the control module 110 outputs a polling signal to the polling module 112. The polling module 112 initiates a timer or a counter (not shown) that is set to count a predetermined time equal to T*X μS, where X=16 μS if the wireless network device is FCC-compliant and X=32 μS if the wireless network device is ETSI-compliant. T is selected such that the predetermined time is at least equal to the duration of a longest radar burst.

While the timer is counting, the polling module 112 polls the MAC FIFO module 102 and checks if any additional DFS records are received subsequent to the last interrupt. The polling module 112 retrieves any additional DFS records received by the MAC FIFO module 102 and outputs the additional DFS records to the data extraction module 106. The data extraction module 106 extracts the DFS information (and optionally, the frequency information) from the additional DFS records. The buffer module 108 stores the DFS information from the additional DFS records in locations starting at the current location of the write pointer.

When the timer expires, the control module 110 checks the location of the write pointer to determine if the buffer module 108 received any additional DFS information. If the buffer module 108 received additional DFS information and has valid DFS information in a total of at least W locations, the control module 110 analyses the DFS information in the W locations as follows.

Figure 3A:
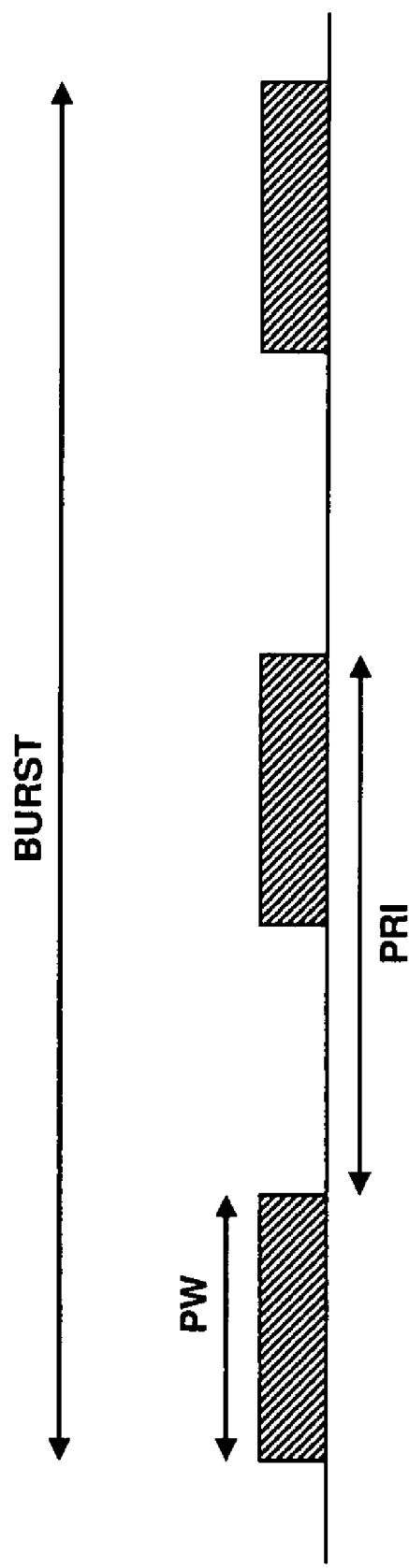
FIG. 3A shows a burst of pulses in a radar signal.

The control module 110 compares the PW and PRI data in the DFS information in W locations to the PW and PRI data of known types of radar, which is tabulated in FIGS. 3B-3C. The control module 110 may store the PW and PRI data of the known types of radar in the form of a look-up table in memory. Typically, the look-up table may include radar patterns having predetermined PW-PRI relationships, which are tabulated in FIGS. 3B-3C. Comparing the PW and PRI data in W locations with radar patterns in the look-up table may be faster than individually comparing the PW and PRI data with each PW and PRI of each type of radar.

Alternately, the look-up table may include acceptable PRI values corresponding different PW values of known types of radar. In that case, the control module 110 may only determine whether the PW data in the DFS information matches PW of a known type of radar. Subsequently, the control module 110 may find corresponding acceptable PRI (and the type of radar) by comparing the PW data to the PW values in the look-up table instead of actually determining PRI and then comparing the PRI to the PRI data of all known types of radar.

Figure 4C:
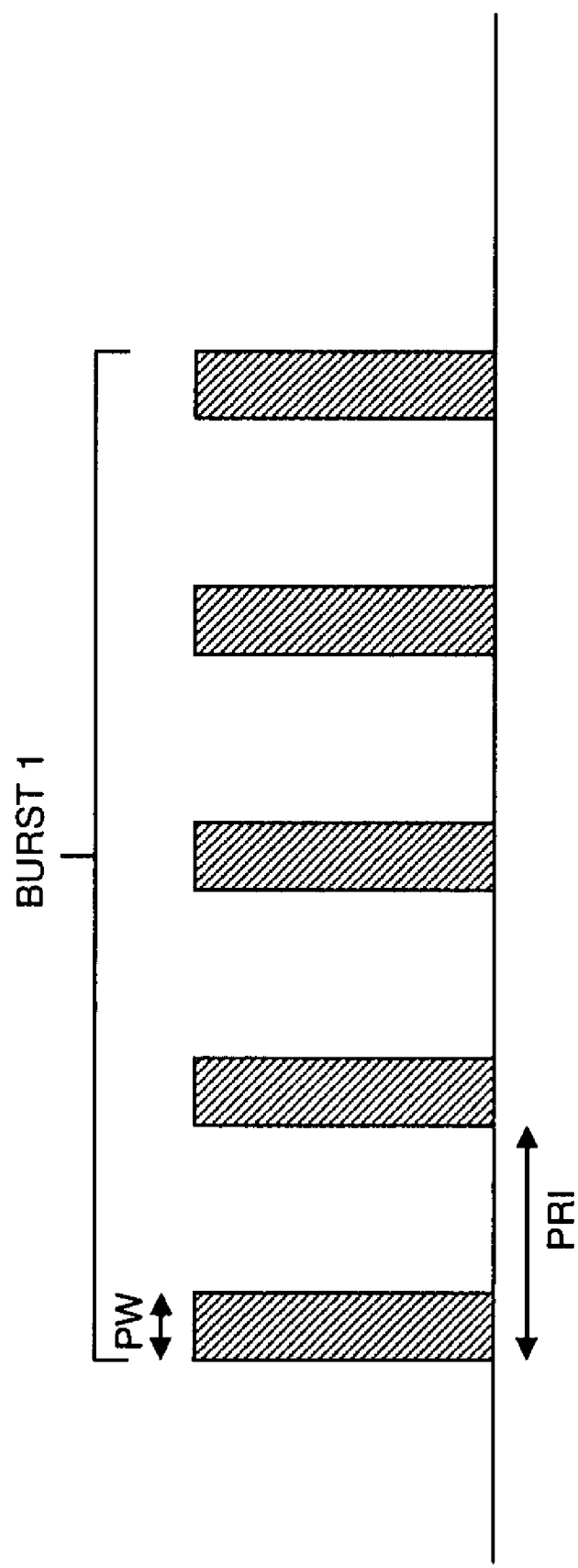
FIG. 4C shows radar pulses in a burst of radar.
Figure 4D:
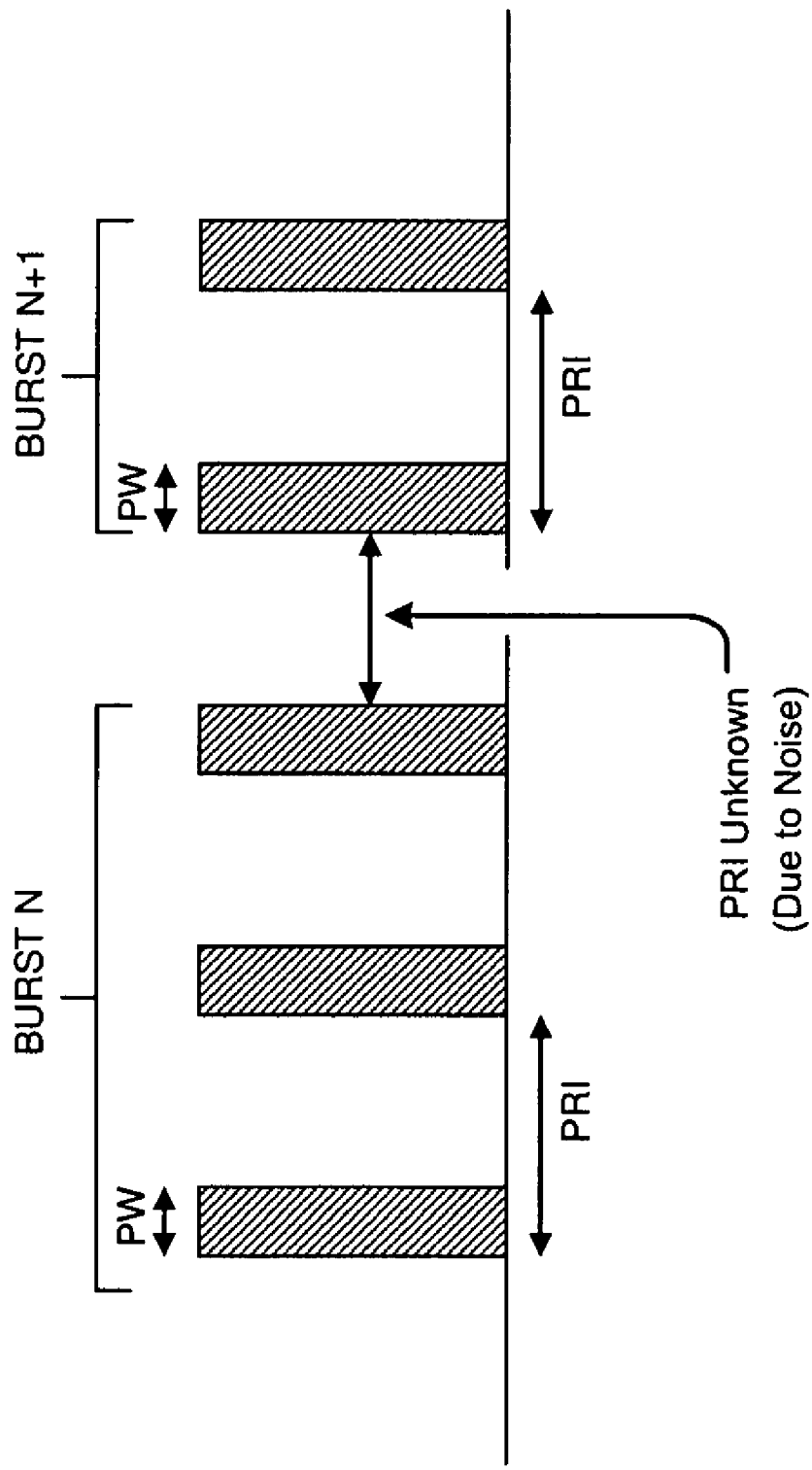
FIG. 4D shows radar pulses in two bursts of radar.

The control module 110 uses different comparison criteria to determine the type of radar since DFS records may be generated in different ways. For example, the five DFS records may be generated by five consecutive radar pulses in the same burst having identical PW and PRI as shown in FIG. 4C or by a total five pulses from two consecutive bursts having identical PW but unequal PRI as shown in FIG. 4D. In either case, the control module 110 determines which type of tone or chirp radar may be present in the pulses received by the BBP as follows.

If the DFS information in all five records indicates that the radar pulses are tone type, then the control module 110 compares the PW and PRI data in each record with the PW and PRI data of known types of radar. Specifically, the control module 110 determines whether the difference between a maximum pulse width and a minimum pulse width of the five pulse widths in the five records is less than or equal to a threshold pulse width, which may be equal to 2 μS.

Additionally, the control module 110 determines whether the average of the maximum and minimum pulse widths matches a valid pulse width (i.e., a pulse width of a known type of radar). The value of the valid pulse width may differ depending on whether the radar pulses are FCC-compliant or ETSI-compliant. Finally, since the radar pulses may be from two consecutive bursts, the control module 110 determines whether the PRI data in a majority of the five records (e.g., three of five records) matches the PRI of a known type of tone radar having the valid PW.

If, however, the DFS information in all five records indicates that the radar pulses are chirp type, then the control module 110 compares the PW and PRI data in each record with the PW and PRI data of known types of radar. Since PW and PRI are variable in chirp radar, the control module 110 determines whether the pulse widths in the five records approximately match one of the known chirp radar patterns shown in FIG. 3B or 3C. Additionally, the control module 110 determines whether the PRI data in a majority of the five records (e.g., three of five records) approximately matches the PRI of a known type of chirp radar.

Figure 4E:
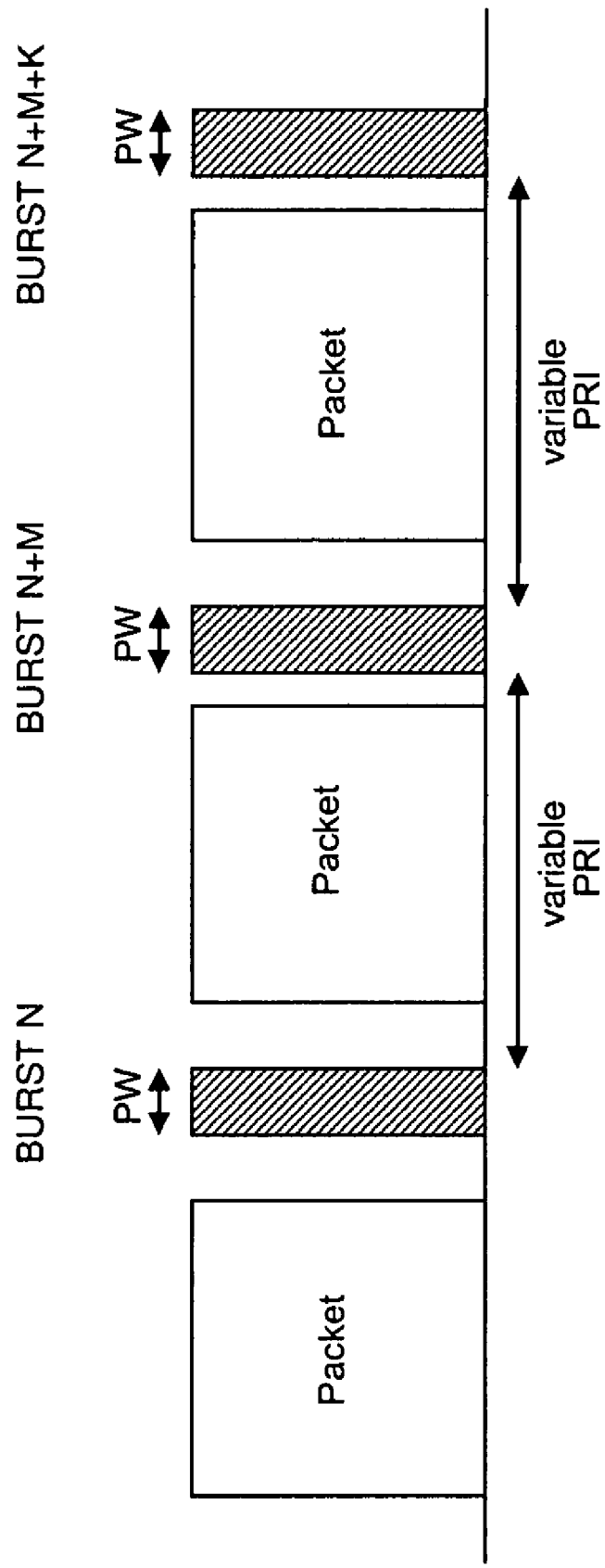
FIG. 4E shows radar pulses in multiple bursts of radar separated by data packets.

Occasionally, the BBP may simultaneously receive radar and packets of wireless data (or interference) as shown in FIG. 4E. In that case, the BBP may receive radar pulses from different bursts as shown. Additionally, pulse widths of received radar pulses may be identical in case of tone radar or variable in case of chirp radar. Thus, the PW (or pulse widths in case of a chirp radar) in the five records may match PW (or pulse widths) of a known type of tone (or chirp) radar. In either case, however, the PRI of the received pulses may vary due to the presence of packets of wireless data (or interference) between the radar pulses. Thus, the control module 110 cannot accurately determine the type of radar by comparing PRI in any of the five records to the PRI of known types tone and/or chirp radar.

Since PRI cannot be used to accurately determine the type of radar, the control module 110 increases the window size and compares PW data in the increased number of records to confirm the type of radar. For example, the window size may be increased from five to eight and read DFS information stored in locations (read pointer−3) to (read pointer+4) in the buffer module 108. In that case, the control module 110 may compare PW data from all eight records to the PW (or pulse widths in case of chirp radar) of known types of tone (or chirp) radar. Alternatively, the window size may be increased from five to ten, and PW from a majority of records (e.g., seven or eight of the ten records) may be compared to the PW (or pulse widths in case of chirp radar) of known types of radar.

Occasionally, due to noise or interference, the BBP may be unable to correctly validate frequency information of the radar pulses. In that case, the control module 110 processes the frequency information in the 56 bytes of the W records to determine whether the pulses that generated the W records are of tone or chirp type.

Figure 5A:
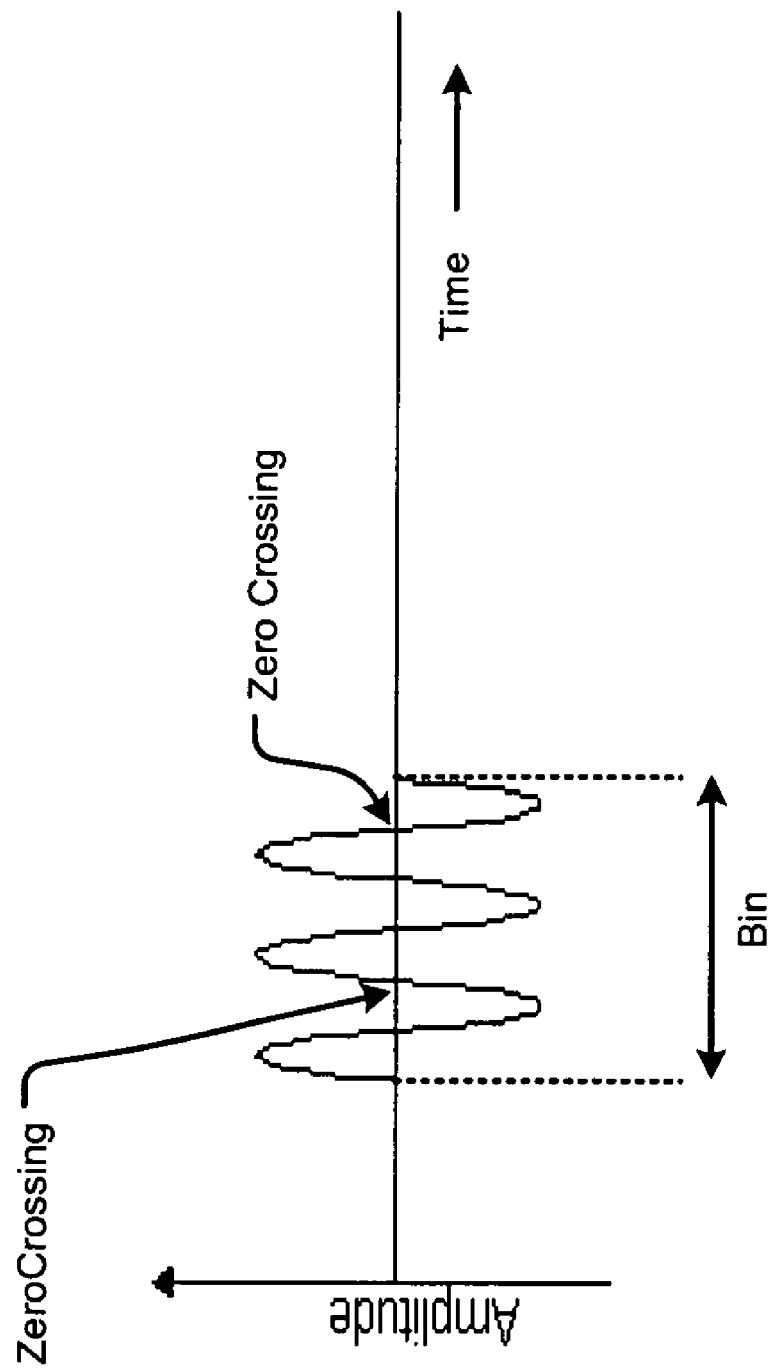
FIG. 5A shows zero-crossings of a radio frequency signal in a bin.
Figure 5C:
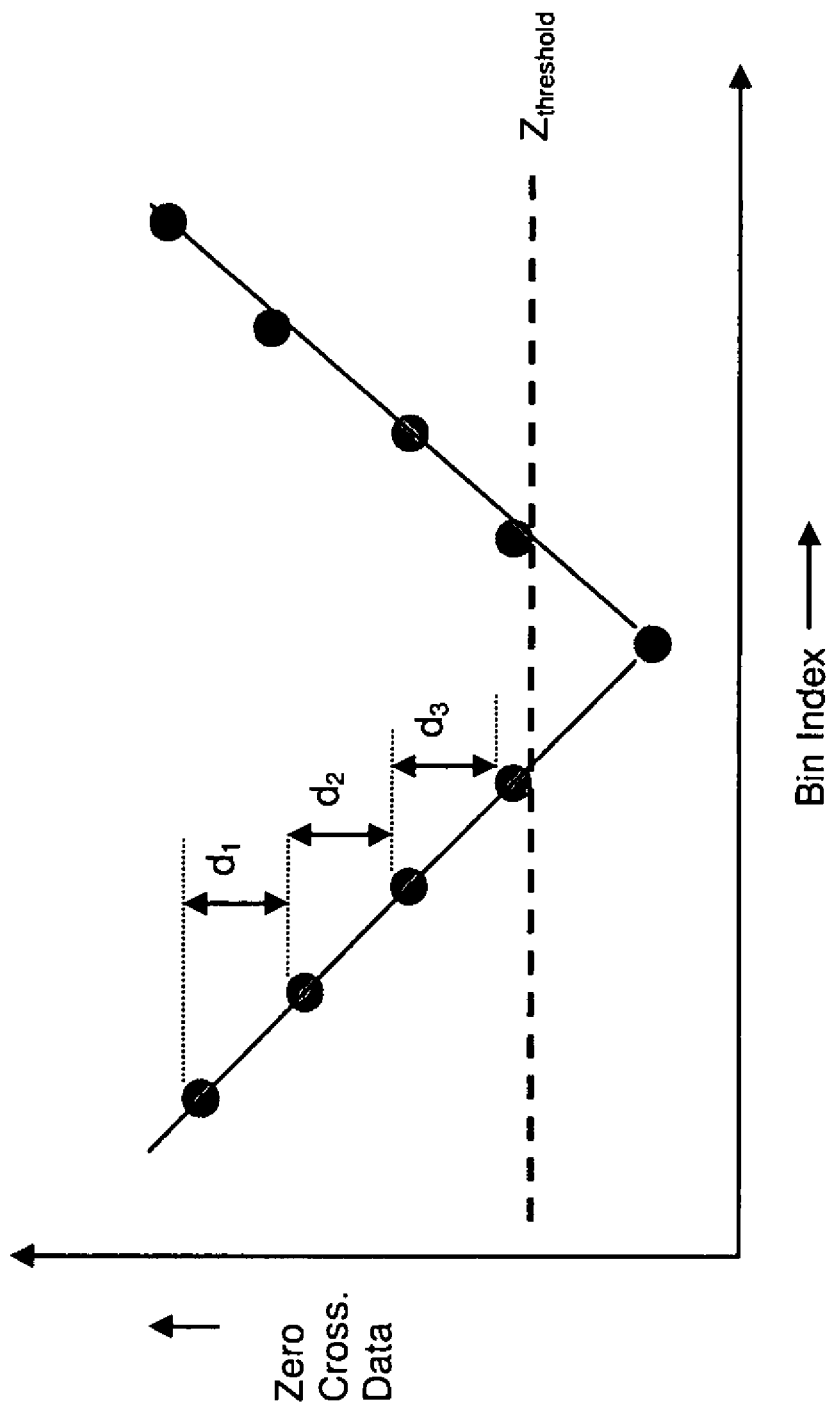
FIG. 5C is a graph of number of zero-crossings per bin relative as a function of number of bins for a chirp type radar.

Referring now to FIGS. 5A-5C, a radio frequency (RF) signal in a radar pulse transitions multiple times between high and low states as shown in FIG. 5A. During each transition, the RF signal crosses a point in time, called a zero-crossing point, where the amplitude of the RF signal is approximately zero as shown. A bin or bin size is a predetermined time period within which the RF signal crosses points of zero-amplitude a predetermined number of times. That is, the RF signal has a predetermined number of zero-crossings within a predetermined bin size. The number of zero-crossings within a bin and the bin size for a particular type of radar are determined based on the FCC or ETSI standards. Typically, the bin size is at least equal to a minimum pulse width of all radar signals. For example, the bin size may be at least 2 μS.

The frequency information in each of the five records includes number of zero-crossings. The number of zero-crossings for tone radar is approximately the same in different bins as shown in FIG. 5B. The control module 110 determines whether a difference between maximum and minimum number of zero-crossings in all bins is less than or equal to a predetermined threshold, called a tone zero-crossing threshold ($Threshold_{tone}$). If true, the control module 110 determines that the radar pulses are tone type.

On the other hand, the frequency of the RF signal varies linearly in chirp radar. Consequently, the number of zero-crossings in each bin may vary from bin to bin as shown in FIG. 5C. Zero-crossings less than a predetermined threshold are disregarded in determining whether the radar is chirp radar. If the difference $d_i$ between the number of zero-crossings in adjacent bins for all i bins is greater than $Threshold_{tone}$, the control module 110 determines that the radar is not a tone radar. That is, if d1 denotes the number of zero-crossings in bin1, d2 denotes the number of zero-crossings in bin2, etc., then the radar is not a tone radar if $(d_i-d_{i+1})>Threshold_{tone}$ for all i.

For a linear chirp radar, the rate of change of zero-crossings (denoted by the slope of the plots in FIG. 5C) between adjacent bins is approximately the same. The control module 110 determines whether the absolute value of the differences in number of zero-crossings between adjacent bins (i.e., | $(d_i - d_{i+1})$|) for all i bins is less than a predetermined threshold called a chirp zero-crossing threshold (Threshold$_{chirp}$). If true, the control module 110 determines that the radar is chirp type.

Figure 6A:
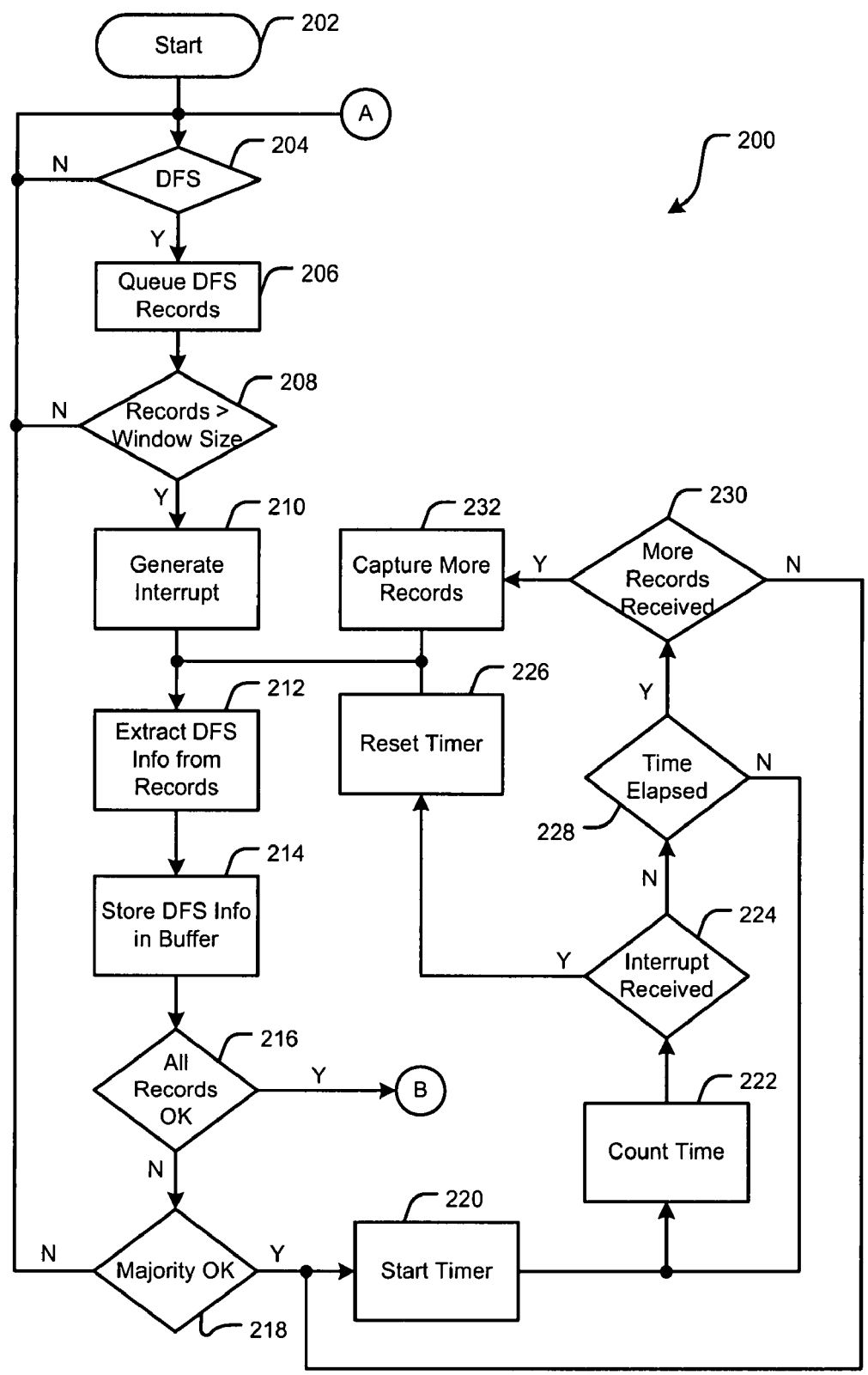
FIG. 6A shows a first portion of a flowchart of an exemplary method for detecting radar in a wireless network device according to the present disclosure.
Figure 6B:
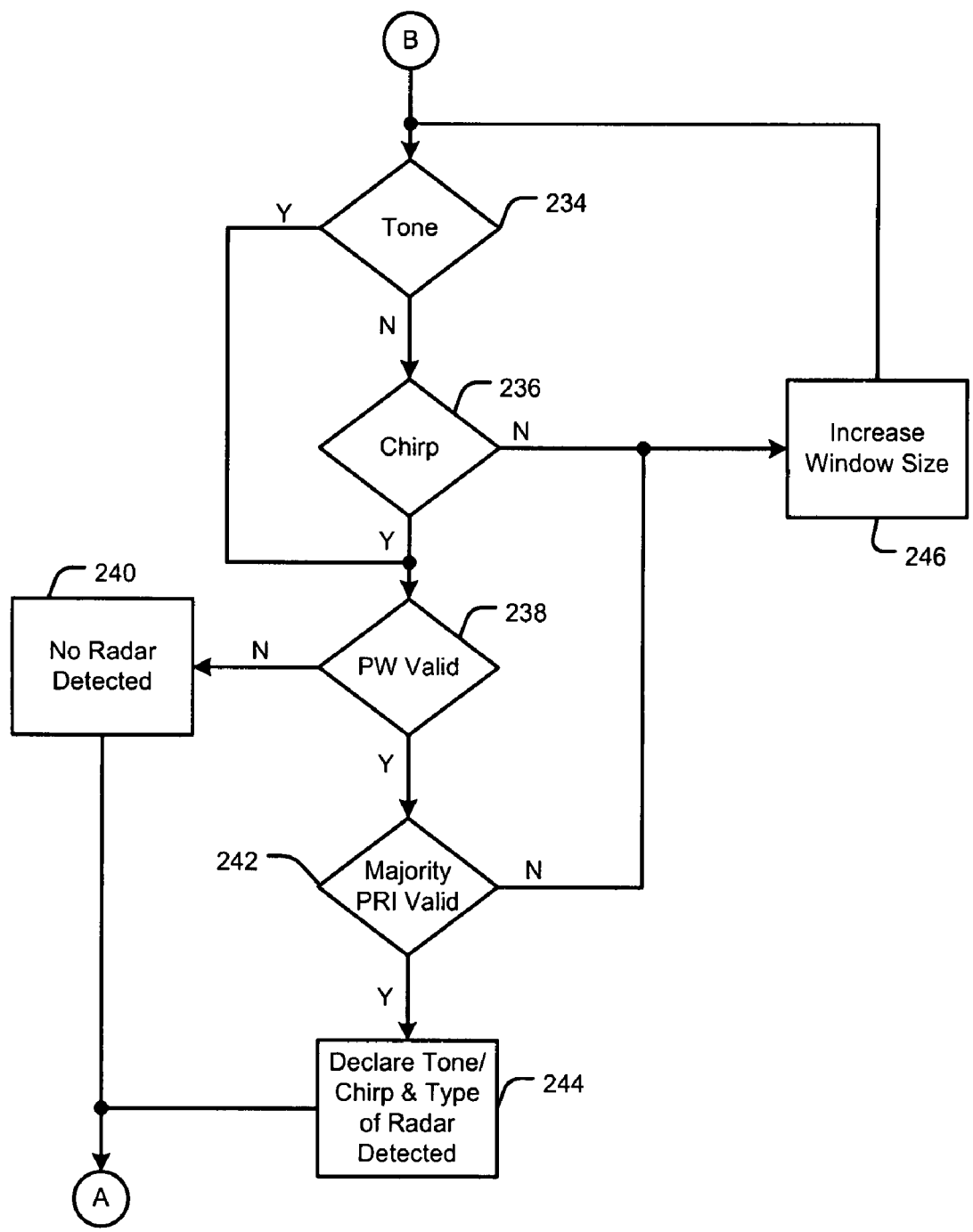
FIG. 6B shows a second portion of the flowchart of the exemplary method for detecting radar in a wireless network device according to the present disclosure.

Referring now to FIGS. 6A-6B, a method 200 for detecting radar in a wireless network device begins at step 202. A media access controller (MAC) determines in step 204 if the wireless network device is performing dynamic frequency selection (DFS). If true, a baseband processor (BBP) outputs records comprising DFS information to a MAC FIFO module 102 in step 206.

The MAC FIFO module 102 checks in step 208 if the number of records queued is greater than or equal to a window size (e.g., five). If true, the MAC FIFO module 102 generates an interrupt or a control signal in step 210. Upon receiving the interrupt, a data extraction module 106 receives the five records from the MAC FIFO module 102 and extracts DFS information from each of the five records in step 212. The DFS information is stored in a buffer module 108 in step 214.

A control module 110 checks in step 216 if the DFS information in all five records indicates that the received pulses are radar pulses. If false, the control module 110 determines in step 218 if the DFS information in a majority of the five records (e.g., three of five) indicates that the received pulses are radar pulses. If false, steps 204 through 218 are repeated.

If the result of step 218 is true, a polling module 112 starts a timer in step 220. The timer counts a predetermined period of time in step 222. The MAC FIFO module 102 determines in step 224 if five more records are received in the queue to generate next interrupt. If true, the control module 110 resets the timer in step 226, and steps starting from step 212 are repeated.

If the result of step 224 is false, the control module 110 checks in step 228 if the timer finished counting time. If false, steps starting at step 222 are repeated. If the timer finished counting time and the MAC FIFO module 102 did not generate another interrupt, the polling module 112 checks in step 230 if the MAC FIFO module 102 received any more records. If false, steps starting at 220 are repeated. If true, the polling module 112 receives additional records from the MAC FIFO module 102 in step 232, and steps starting step 212 are repeated.

If the result of step 216 is true, the control module 110 determines in step 234 if the DFS information in all five records indicates that the received pulses are of tone type radar. If false, the control module 110 determines in step 236 if the DFS information in all five records indicates that the received pulses are of chirp type radar.

If the results of steps 234 and 236 are true, the control module 110 determines in step 238 if pulse width information in the five records matches with the pulse width information of a known tone or chirp radar. If false, the control module 110 determines in step 240 that the pulses received are not radar pulses, and steps starting at step 204 are repeated. If true, however, the control module 110 determines in step 242 if PRI information in a majority of the five records matches the PRI information of a known tone or chirp radar. If true, the control module 110 generates a control signal in step 244 identifying the type of detected radar.

If the results of steps 236 and 244 are false, then in step 246, the control module 110 increases the window size (e.g., from five to eight), reads additional records stored in the buffer module 108, and steps starting at step 234 are repeated.

Figure 7B:
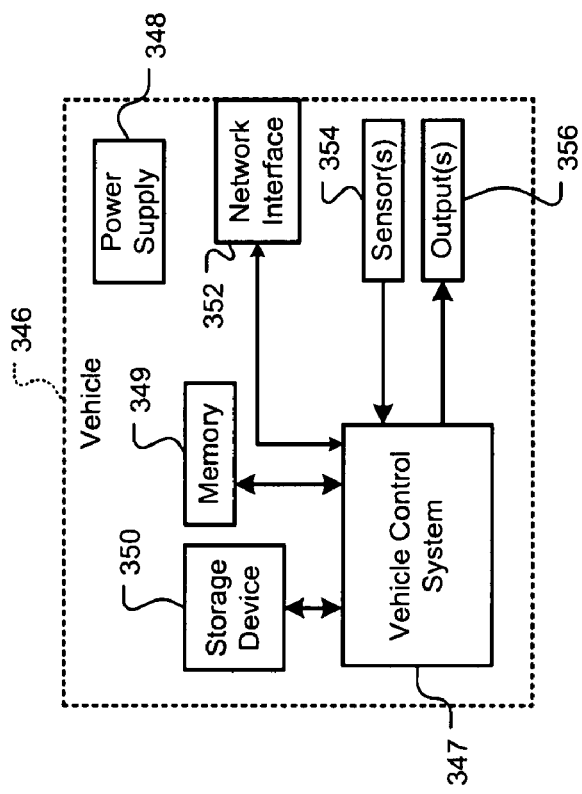
FIG. 7B is a functional block diagram of a vehicle control system.
Figure 7A:
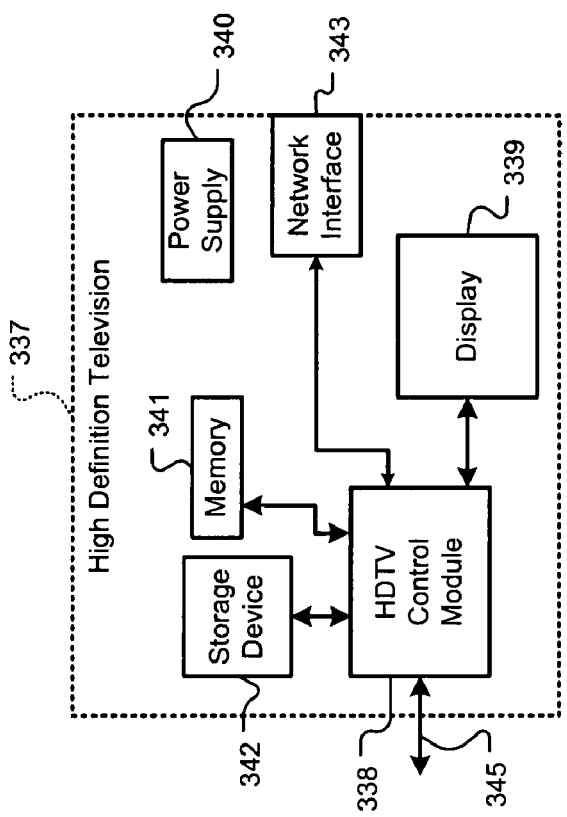
FIG. 7A is a functional block diagram of a high definition television.

Referring now to FIGS. 7A-7E, various exemplary implementations incorporating the teachings of the present disclosure are shown. Referring now to FIG. 7A, the teachings of the disclosure can be implemented in a network interface 343 of a high definition television (HDTV) 337. The HDTV 337 includes a HDTV control module 338, a display 339, a power supply 340, memory 341, a storage device 342, the network interface 343, and an external interface 345.

The HDTV 337 can receive input signals from the network interface 343 and/or the external interface 345, which can send and receive information via cable, broadband Internet, and/or satellite. The HDTV control module 338 may process the input signals, including encoding, decoding, filtering, and/or formatting, and generate output signals. The output signals may be communicated to one or more of the display 339, memory 341, the storage device 342, the network interface 343, and the external interface 345.

Memory 341 may include random access memory (RAM) and/or nonvolatile memory such as flash memory, phase change memory, or multi-state memory, in which each memory cell has more than two states. The storage device 342 may include an optical storage drive, such as a DVD drive, and/or a hard disk drive (HDD). The HDTV control module 338 communicates externally via the network interface 343 and/or the external interface 345. The power supply 340 provides power to the components of the HDTV 337.

Referring now to FIG. 7B, the teachings of the disclosure may be implemented in a network interface 352 of a vehicle 346. The vehicle 346 may include a vehicle control system 347, a power supply 348, memory 349, a storage device 350, and the network interface 352. The vehicle control system 347 may be a powertrain control system, a body control system, an entertainment control system, an anti-lock braking system (ABS), a navigation system, a telematics system, a lane departure system, an adaptive cruise control system, etc.

The vehicle control system 347 may communicate with one or more sensors 354 and generate one or more output signals 356. The sensors 354 may include temperature sensors, acceleration sensors, pressure sensors, rotational sensors, airflow sensors, etc. The output signals 356 may control engine operating parameters, transmission operating parameters, suspension parameters, etc.

The power supply 348 provides power to the components of the vehicle 346. The vehicle control system 347 may store data in memory 349 and/or the storage device 350. Memory 349 may include random access memory (RAM) and/or nonvolatile memory such as flash memory, phase change memory, or multi-state memory, in which each memory cell has more than two states. The storage device 350 may include an optical storage drive, such as a DVD drive, and/or a hard disk drive (HDD). The vehicle control system 347 may communicate externally using the network interface 352.

Figure 7D:
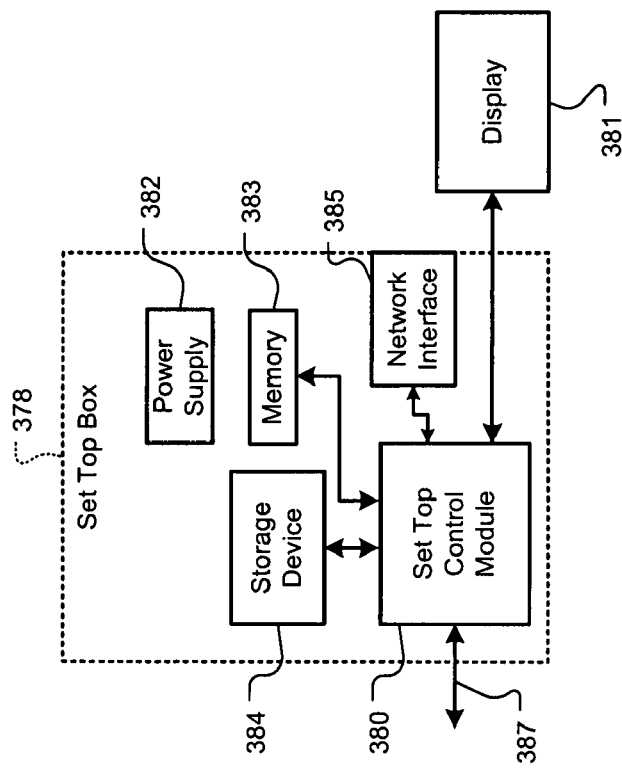
FIG. 7D is a functional block diagram of a set top box.
Figure 7C:
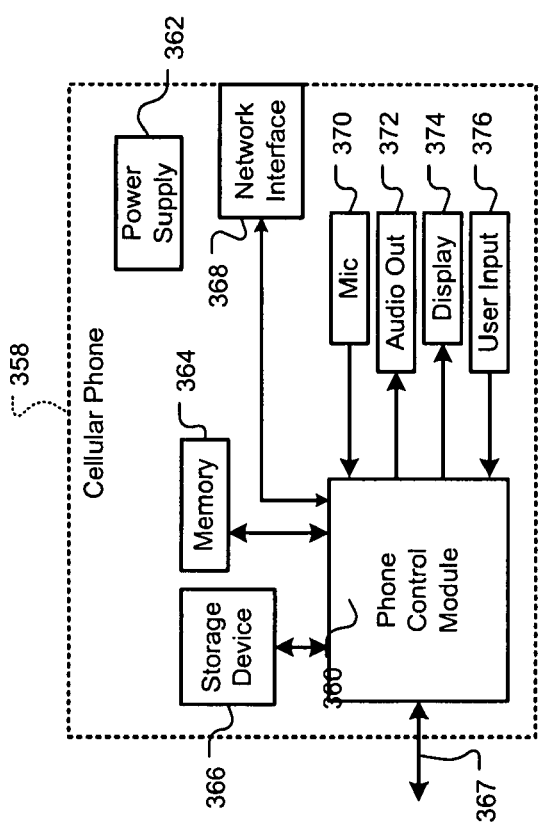
FIG. 7C is a functional block diagram of a cellular phone.

Referring now to FIG. 7C, the teachings of the disclosure can be implemented in a network interface 368 of a cellular phone 358. The cellular phone 358 includes a phone control module 360, a power supply 362, memory 364, a storage device 366, and a cellular network interface 367. The cellular phone 358 may include the network interface 368, a microphone 370, an audio output 372 such as a speaker and/or output jack, a display 374, and a user input device 376 such as a keypad and/or pointing device.

The phone control module 360 may receive input signals from the cellular network interface 367, the network interface 368, the microphone 370, and/or the user input device 376. The phone control module 360 may process signals, including encoding, decoding, filtering, and/or formatting, and generate output signals. The output signals may be communicated to one or more of memory 364, the storage device 366, the cellular network interface 367, the network interface 368, and the audio output 372.

Memory 364 may include random access memory (RAM) and/or nonvolatile memory such as flash memory, phase change memory, or multi-state memory, in which each memory cell has more than two states. The storage device 366 may include an optical storage drive, such as a DVD drive, and/or a hard disk drive (HDD). The power supply 362 provides power to the components of the cellular phone 358.

Referring now to FIG. 7D, the teachings of the disclosure can be implemented in a network interface 385 of a set top box 378. The set top box 378 includes a set top control module 380, a display 381, a power supply 382, memory 383, a storage device 384, and the network interface 385.

The set top control module 380 may receive input signals from the network interface 385 and an external interface 387, which can send and receive information via cable, broadband Internet, and/or satellite. The set top control module 380 may process signals, including encoding, decoding, filtering, and/or formatting, and generate output signals. The output signals may include audio and/or video signals in standard and/or high definition formats. The output signals may be communicated to the network interface 385 and/or to the display 381. The display 381 may include a television, a projector, and/or a monitor.

The power supply 382 provides power to the components of the set top box 378. Memory 383 may include random access memory (RAM) and/or nonvolatile memory such as flash memory, phase change memory, or multi-state memory, in which each memory cell has more than two states. The storage device 384 may include an optical storage drive, such as a DVD drive, and/or a hard disk drive (HDD).

Figure 7E:
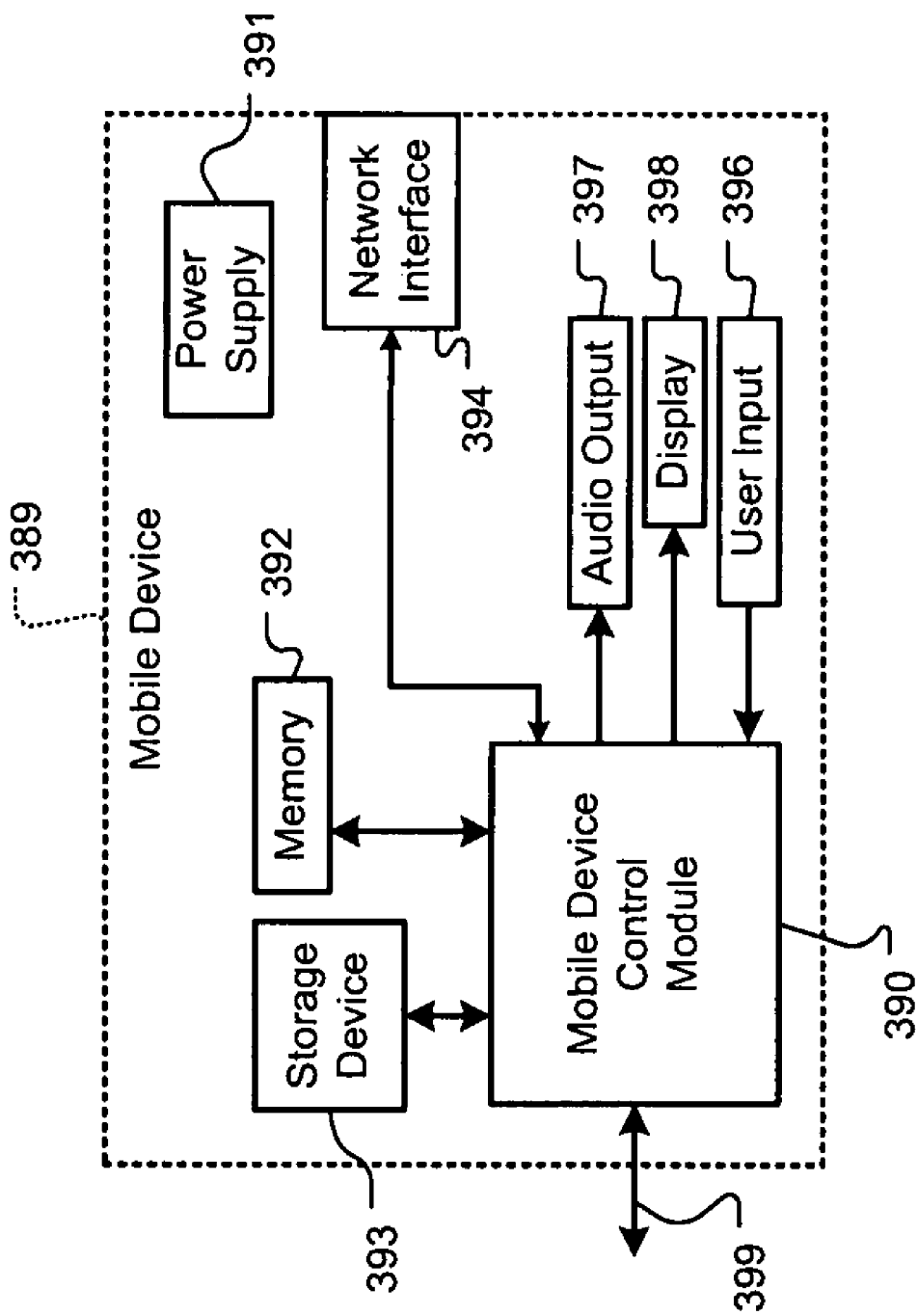
FIG. 7E is a functional block diagram of a mobile device.

Referring now to FIG. 7E, the teachings of the disclosure can be implemented in a network interface 394 of a mobile device 389. The mobile device 389 may include a mobile device control module 390, a power supply 391, memory 392, a storage device 393, the network interface 394, and an external interface 399.

The mobile device control module 390 may receive input signals from the network interface 394 and/or the external interface 399. The external interface 399 may include USB, infrared, and/or Ethernet. The input signals may include compressed audio and/or video, and may be compliant with the MP3 format. Additionally, the mobile device control module 390 may receive input from a user input 396 such as a keypad, touchpad, or individual buttons. The mobile device control module 390 may process input signals, including encoding, decoding, filtering, and/or formatting, and generate output signals.

The mobile device control module 390 may output audio signals to an audio output 397 and video signals to a display 398. The audio output 397 may include a speaker and/or an output jack. The display 398 may present a graphical user interface, which may include menus, icons, etc. The power supply 391 provides power to the components of the mobile device 389. Memory 392 may include random access memory (RAM) and/or nonvolatile memory such as flash memory, phase change memory, or multi-state memory, in which each memory cell has more than two states. The storage device 393 may include an optical storage drive, such as a DVD drive, and/or a hard disk drive (HDD). The mobile device may include a personal digital assistant, a media player, a laptop computer, a gaming console or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising:
    a first-in first-out (FIFO) module that receives records having dynamic frequency selection (DFS) information generated based on pulses received, and that generates a control signal for every N of said records received, where N is an integer greater than 1;
    a polling module that selectively polls said FIFO module, and that reads M of said records received by said FIFO module, where M is an integer greater than or equal to 1 and less than N;
    a data extraction module that extracts said DFS information from said N of said records when said control signal is received, and that selectively extracts said DFS information from said M of said records; and
    a control module that determines whether said pulses are a type of radar based on said DFS information extracted from at least N of (N+M) of said records.

2. The system of claim 1 wherein said DFS information comprises pulse widths and pulse repetition rates of said pulses, signal strength of radio frequency (RF) signals in said pulses, and whether said pulses are one of a tone type and a chirp type radar pulses.

3. The system of claim 1 wherein said polling module polls said FIFO module when said DFS information extracted from a predetermined number of records out of said N of said records indicates that said pulses are not radar pulses.

4. The system of claim 1 further comprising a buffer module that stores said DFS information extracted by said data extraction module.

5. The system of claim 1 wherein said pulses are received from at least one burst of radar.

6. The system of claim 5 wherein said control module determines that said pulses are a type of tone radar when:
    said DFS information extracted from each of said at least N of said (N+M) of said records includes information that a corresponding one of said pulses is a tone radar pulse;
    an average of pulse widths in said DFS information extracted from each of said at least N of said (N+M) of said records approximately matches a pulse width of a predetermined type of tone radar;
    a difference between a maximum and a minimum of said pulse widths is less than a predetermined threshold; and
    pulse repetition intervals in said DFS information extracted from a predetermined number of said at least N of said (N+M) of said records approximately match a pulse repetition interval of said predetermined type of tone radar.

7. The system of claim 5 wherein said control module determines that said pulses are a type of chirp radar when:
    said DFS information extracted from each of said at least N of said (N+M) of said records includes information that a corresponding one of said pulses is a chirp radar pulse;
    pulse widths in said DFS information extracted from said at least N of said (N+M) of said records approximately match pulse widths of a predetermined type of chirp radar; and
    pulse repetition intervals in said DFS information extracted from a predetermined number of said at least N of said (N+M) of said records approximately match pulse repetition intervals of said predetermined type of chirp radar.

8. The system of claim 1 wherein said control module determines whether said pulses are a type of one of a tone radar and a chirp radar based on pulse widths in said DFS information extracted from at least N of said records when said pulses are received from at least one burst of radar and when said pulses are separated by at least one data packet.

9. The system of claim 8 wherein said control module determines that said pulses are a type of tone radar when said pulse widths match a pulse width of a predetermined type of tone radar and wherein said control module determines that said pulses are a type of chirp radar when said pulse widths match pulse widths of a predetermined type of chirp radar.

10. The system of claim 1 wherein said pulses comprise radio frequency (RF) signals and said DFS information includes a number of zero-crossings of said RF signals per bin for a plurality of bins, where said bin is a time period greater than or equal to a smallest of pulse widths of predetermined types of radar pulses.

11. The system of claim 10 wherein said control module determines that said pulses are tone type radar pulses when a difference between maximum and minimum values of said number of zero-crossings is less than a predetermined threshold.

12. The system of claim 10 wherein said control module determines that said pulses are chirp type radar pulses when:
 differences between said number of zero-crossings in adjacent bins are greater than a first predetermined threshold; and
 a rate of change of said number of zero-crossings in successive bins is less than a second predetermined threshold.

13. A medium access controller (MAC) comprising the system of claim 1 and further comprising a physical layer module (PHY) that communicates said records to the MAC.

14. A wireless network device comprising the MAC of claim 13 and further comprising at least one antenna that receives said pulses and that communicates said pulses to said PHY.

15. A radar detection device comprising the system of claim 1.

16. A method, comprising:
 receiving records having dynamic frequency selection (DFS) information generated based on pulses received in a first-in first-out (FIFO) module;
 generating a control signal for every N of said records received, where N is an integer greater than 1;
 selectively polling said FIFO module;
 reading M of said records received by said FIFO module, where M is an integer greater than or equal to 1 and less than N;
 extracting said DFS information from said N of said records when said control signal is received;
 selectively extracting said DFS information from said M of said records; and
 determining whether said pulses are a type of radar based on said DFS information extracted from at least N of said (N+M) of said records.

17. The method of claim 16 further comprising receiving said records having said DFS information that includes pulse widths and pulse repetition rates of said pulses, signal strength of radio frequency (RF) signals in said pulses, and whether said pulses are one of a tone type and a chirp type radar pulses.

18. The method of claim 16 further comprising polling said FIFO module when said DFS information extracted from a predetermined number of records out of said N of said records indicates that said pulses are not radar pulses.

19. The method of claim 16 further comprising storing said DFS information extracted by said data extraction module.

20. The method of claim 16 further comprising receiving said pulses from at least one burst of radar.

21. The method of claim 20 further comprising determining that said pulses are a type of tone radar when:
 said DFS information extracted from each of said at least N of said (N+M) of said records includes information that a corresponding one of said pulses is a tone radar pulse;
 an average of pulse widths in said DFS information extracted from each of said at least N of said (N+M) of said records approximately matches a pulse width of a predetermined type of tone radar;
 a difference between a maximum and a minimum of said pulse widths is less than a predetermined threshold; and
 pulse repetition intervals in said DFS information extracted from a predetermined number of said at least N of said (N+M) of said records approximately match a pulse repetition interval of said predetermined type of tone radar.

22. The method of claim 20 further comprising determining that said pulses are a type of chirp radar when:
 said DFS information extracted from each of said at least N of said (N+M) of said records includes information that a corresponding one of said pulses is a chirp radar pulse;
 pulse widths in said DFS information extracted from said at least N of said (N+M) of said records approximately match pulse widths of a predetermined type of chirp radar; and
 pulse repetition intervals in said DFS information extracted from a predetermined number of said at least N of said (N+M) of said records approximately match pulse repetition intervals of said predetermined type of chirp radar.

23. The method of claim 16 further comprising determining whether said pulses are a type of one of a tone radar and a chirp radar based on pulse widths in said DFS information extracted from at least N of said records when said pulses are received from at least one burst of radar and when said pulses are separated by at least one data packet.

24. The method of claim 23 further comprising determining that said pulses are a type of tone radar when said pulse widths match a pulse width of a predetermined type of tone radar and determining that said pulses are a type of chirp radar when said pulse widths match pulse widths of a predetermined type of chirp radar.

25. The method of claim 16 further comprises receiving said records when said pulses include radio frequency (RF) signals and wherein said DFS information includes a number of zero-crossings of said RF signals per bin for a plurality of bins, where said bin is a time period greater than or equal to a smallest of pulse widths of predetermined types of radar pulses.

26. The method of claim 25 further comprising determining that said pulses are tone type radar pulses when a difference between maximum and minimum values of said number of zero-crossings is less than a predetermined threshold.

27. The method of claim 25 further comprises determining that said pulses are chirp type radar pulses when:
 differences between said number of zero-crossings in adjacent bins are greater than a first predetermined threshold; and
 a rate of change of said number of zero-crossings in successive bins is less than a second predetermined threshold.

28. The method of claim 16 further comprising communicating between a physical layer module (PHY) and a medium access controller (MAC) and communicating said records to said MAC.

29. The method of claim 28 further comprising receiving said pulses via at least one antenna in a wireless network device and communicating said pulses to said PHY.

30. The method of claim 16 further comprising determining whether said pulses include radar when said pulses are received by a radar detection device.

31. A system, comprising:
   first-in first-out (FIFO) means for
      receiving records having dynamic frequency selection (DFS) information generated based on pulses received, and
      generating a control signal for every N of said records received, where N is an integer greater than 1;
   polling means for selectively polling said FIFO means and reading M of said records received by said FIFO means, where M is an integer greater than or equal to 1 and less than N;
   data extraction means for
      extracting said DFS information from said N of said records when said control signal is received, and
      selectively extracting said DFS information from said M of said records; and
   control means for determining whether said pulses are a type of radar based on said DFS information extracted from at least N of (N+M) of said records.

32. The system of claim 31 wherein said DFS information comprises pulse widths and pulse repetition rates of said pulses, signal strength of radio frequency (RF) signals in said pulses, and whether said pulses are one of a tone type and a chirp type radar pulses.

33. The system of claim 31 wherein said polling means polls said FIFO means when said DFS information extracted from a predetermined number of records out of said N of said records indicates that said pulses are not radar pulses.

34. The system of claim 31 further comprising buffer means for storing said DFS information extracted by said data extraction means.

35. The system of claim 31 wherein said pulses are received from at least one burst of radar.

36. The system of claim 35 wherein said control means determines that said pulses are a type of tone radar when:
   said DFS information extracted from each of said at least N of said (N+M) of said records includes information that a corresponding one of said pulses is a tone radar pulse;
   an average of pulse widths in said DFS information extracted from each of said at least N of said (N+M) of said records approximately matches a pulse width of a predetermined type of tone radar;
   a difference between a maximum and a minimum of said pulse widths is less than a predetermined threshold; and
   pulse repetition intervals in said DFS information extracted from a predetermined number of said at least N of said (N+M) of said records approximately match a pulse repetition interval of said predetermined type of tone radar.

37. The system of claim 35 wherein said control means determines that said pulses are a type of chirp radar when:
   said DFS information extracted from each of said at least N of said (N+M) of said records includes information that a corresponding one of said pulses is a chirp radar pulse;
   pulse widths in said DFS information extracted from said at least N of said (N+M) of said records approximately match pulse widths of a predetermined type of chirp radar; and
   pulse repetition intervals in said DFS information extracted from a predetermined number of said at least N of said (N+M) of said records approximately match pulse repetition intervals of said predetermined type of chirp radar.

38. The system of claim 31 wherein said control means determines whether said pulses are a type of one of a tone radar and a chirp radar based on pulse widths in said DFS information extracted from at least N of said records when said pulses are received from at least one burst of radar and when said pulses are separated by at least one data packet.

39. The system of claim 38 wherein said control means determines that said pulses are a type of tone radar when said pulse widths match a pulse width of a predetermined type of tone radar and wherein said control means determines that said pulses are a type of chirp radar when said pulse widths match pulse widths of a predetermined type of chirp radar.

40. The system of claim 31 wherein said pulses comprise radio frequency (RF) signals and said DFS information includes a number of zero-crossings of said RF signals per bin for a plurality of bins, where said bin is a time period greater than or equal to a smallest of pulse widths of predetermined types of radar pulses.

41. The system of claim 40 wherein said control means determines that said pulses are tone type radar pulses when a difference between maximum and minimum values of said number of zero-crossings is less than a predetermined threshold.

42. The system of claim 40 wherein said control means determines that said pulses are chirp type radar pulses when:
   differences between said number of zero-crossings in adjacent bins are greater than a first predetermined threshold; and
   a rate of change of said number of zero-crossings in successive bins is less than a second predetermined threshold.

43. A medium access controller (MAC) comprising the system of claim 31 and further comprising physical layer means (PHY) for communicating said records to the MAC.

44. A wireless network device comprising the MAC of claim 43 and further comprising at least one antenna means for receiving said pulses and communicating said pulses to said PHY means.

45. A radar detection device comprising the system of claim 31.

* * * * *